United States Patent
Singh et al.

(10) Patent No.: US 12,248,486 B2
(45) Date of Patent: Mar. 11, 2025

(54) SYSTEM FOR CREATING A DATASET NETWORK

(71) Applicant: Cinchy Inc., Toronto (CA)

(72) Inventors: Karanjot Singh, Toronto (CA); Daniel Demers, Toronto (CA)

(73) Assignee: Cinchy Inc., Toronto (CA)

( * ) Notice: Subject to any disclaimer, the term of this patent is extended or adjusted under 35 U.S.C. 154(b) by 0 days.

(21) Appl. No.: 17/307,571

(22) Filed: May 4, 2021

(65) Prior Publication Data

US 2021/0256022 A1   Aug. 19, 2021

Related U.S. Application Data

(63) Continuation of application No. PCT/CA2020/051595, filed on Nov. 23, 2020.

(60) Provisional application No. 62/939,504, filed on Nov. 22, 2019, provisional application No. 62/939,515, filed on Nov. 22, 2019.

(51) Int. Cl.
  *G06F 16/2458* (2019.01)
  *G06F 16/242* (2019.01)
  *G06F 16/2457* (2019.01)

(52) U.S. Cl.
  CPC ...... *G06F 16/2474* (2019.01); *G06F 16/2448* (2019.01); *G06F 16/24573* (2019.01)

(58) Field of Classification Search
  CPC ............ G06F 16/2474; G06F 16/2448; G06F 16/24573
  See application file for complete search history.

(56) References Cited

U.S. PATENT DOCUMENTS

| 8,356,052 B2 | 1/2013 | Zhang et al. | |
| 2011/0295440 A1* | 12/2011 | Noma | H04W 24/00 700/297 |
| 2014/0222631 A1 | 8/2014 | Love et al. | |
| 2014/0278294 A1* | 9/2014 | Yeager | G06F 30/20 703/22 |
| 2015/0227536 A1 | 8/2015 | Montulli et al. | |
| 2016/0117362 A1 | 4/2016 | Bagehorn et al. | |
| 2017/0024488 A1 | 1/2017 | Henderson | |

(Continued)

OTHER PUBLICATIONS

El Hamad, A.; International Search Report from corresponding PCT Application No. PCT/CA2020/051595; search completed Jan. 27, 2021.

(Continued)

*Primary Examiner* — William Spieler
(74) *Attorney, Agent, or Firm* — Laurie Wright; Christopher N. Hunter; Blake, Cassels & Graydon LLP

(57) ABSTRACT

The following provides a platform for creating a shared network of data nodes. Each data node is self-describing, self-connecting, and self-securing. The data network taught herein can prevent data silo environments. Each node has: a dataset containing version-controlled data; an access controls layer limiting user access to the dataset; a metadata layer defining characteristics of the dataset and connecting to another node. One or more links are created to associate the node with the subsequent node to create the network of data nodes such that a change in the dataset affects a change in the network of data nodes; and the network of data nodes comprises a query layer to interact with the dataset and the subsequent dataset.

18 Claims, 24 Drawing Sheets

(56) References Cited

U.S. PATENT DOCUMENTS

2017/0364703 A1 12/2017 Jacob et al.
2017/0371881 A1 12/2017 Reynolds et al.
2019/0179926 A1 6/2019 Das et al.
2019/0332697 A1 10/2019 Williams et al.

OTHER PUBLICATIONS

Supplementary European Search Report, dated Oct. 9, 2023, issued on corresponding EP application No. 20891323.

* cited by examiner

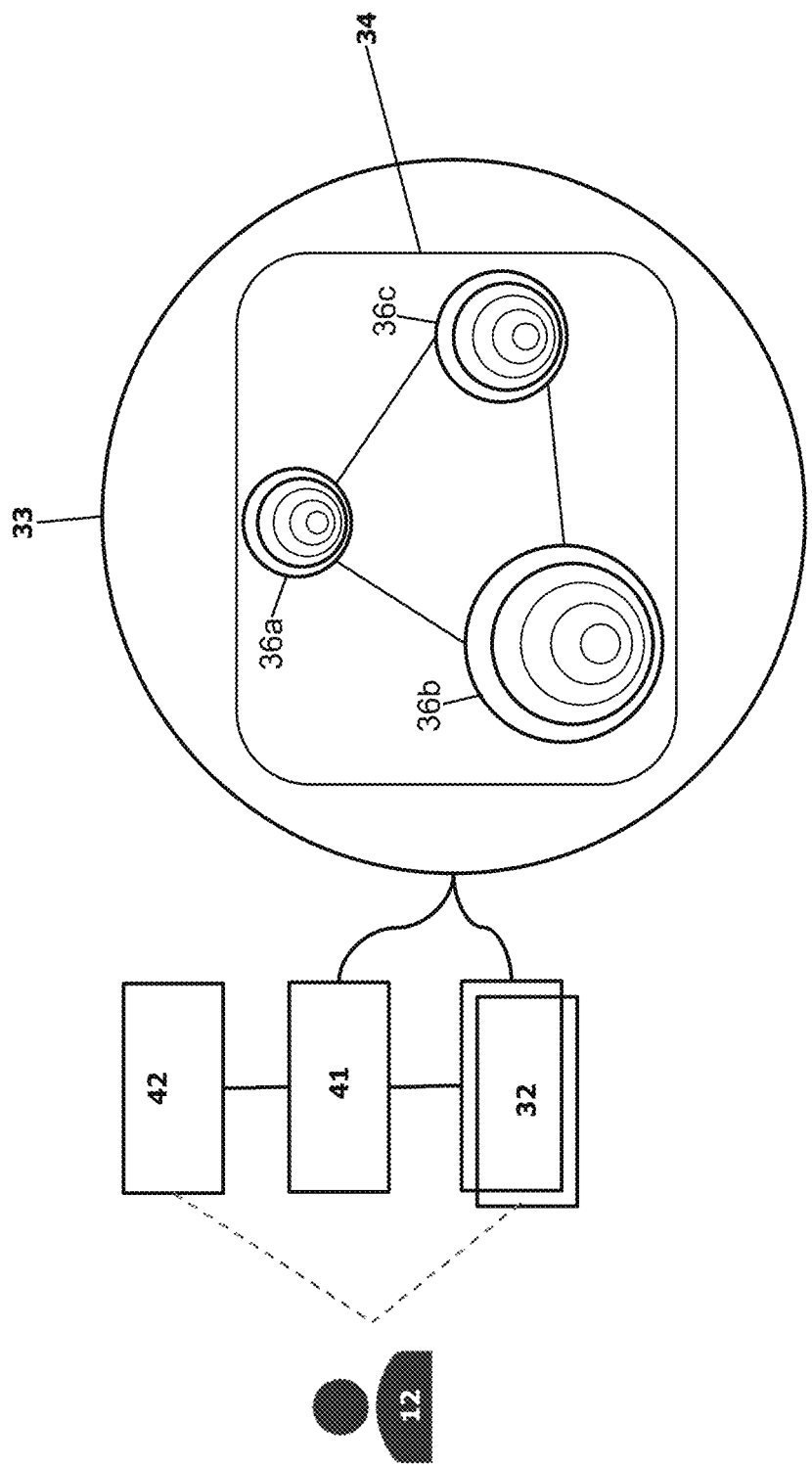

FIG. 8a

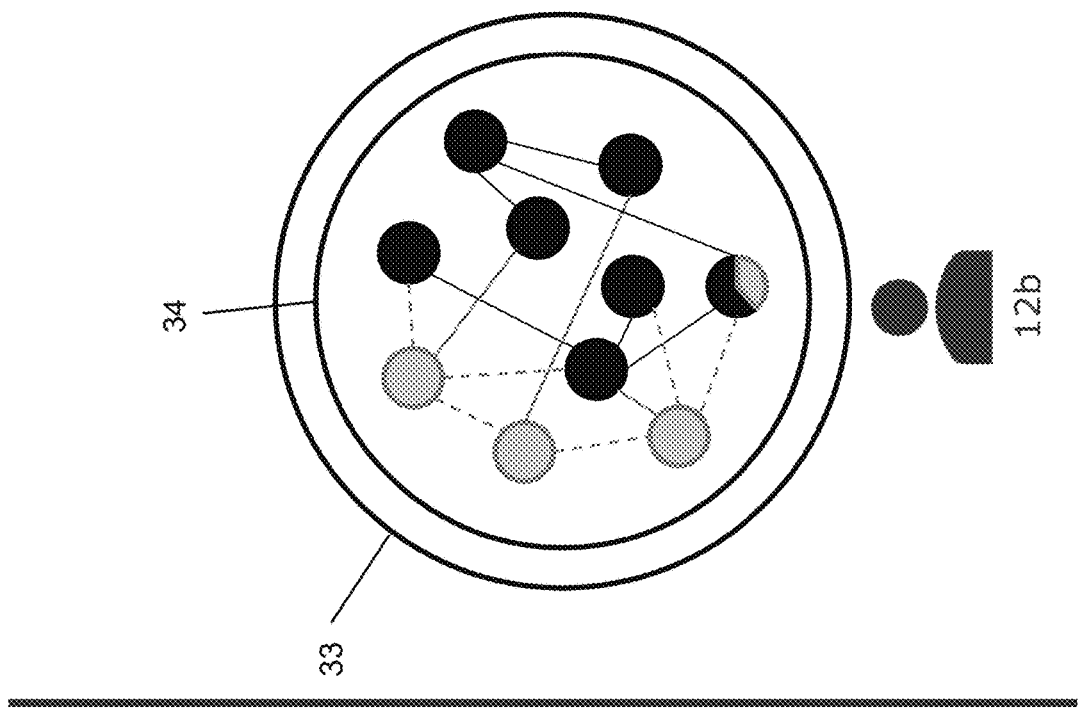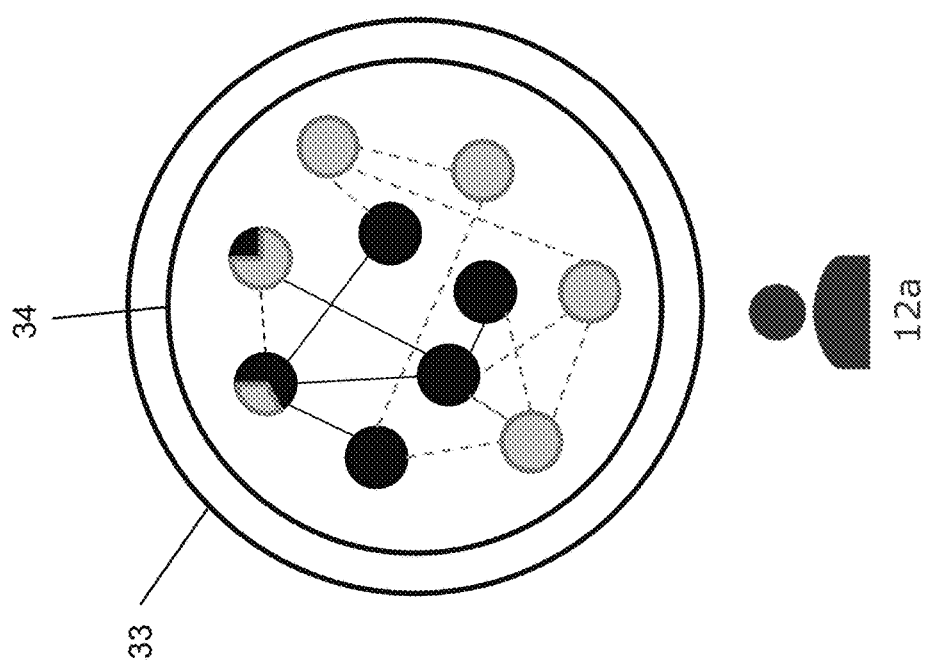
FIG. 10

FIG. 11

2 Access Grants

Grant 1:
- Editable Columns: Full Name, Company
- Editable Row Filter: None

Grant 2:
- Editable Columns: Phone
- Editable Row Filter: Region IN (CA, OR, WA)

| Full Name | Company | Region | Phone Number |
|---|---|---|---|
| Alden Browning | Ante Company | AZ | (245) 407-6579 |
| Macon Lynn | Elit Corporation | AZ | (858) 843-2664 |
| Clarke Kane | At Fringilla PC | CA | (549) 826-1349 |
| Jemima Cabrera | Malesuada Malesuada Limited | CA | (280) 823-2125 |
| Ivan Landry | Gravida Sagittis LLP | CA | (920) 153-7889 |
| Hasad Keith | Aliquam Eros Turpis Limited | CO | (265) 116-7230 |
| Yvonne Hudson | Fringilla Purus Inc. | CO | (861) 642-8764 |
| Benedict Burgess | Massa Integer Vitae Ltd | DE | (128) 811-4172 |
| Neville Burch | Euismod Enim Associates | DE | (966) 387-9003 |
| Rigel Blevins | Justo PC | FL | (514) 987-6872 |
| Alma Dominguez | Purus Sapien PC | FL | (519) 656-5418 |
| Amena Huff | Quam Dignissim Incorporated | GA | (964) 345-4286 |
| Lorena Moreno | Ultrices Posuere Cubilia Associates | GA | (323) 871-9211 |
| Bryar Ross | Dolor LLP | IL | (845) 774-2470 |
| Kane Ball | Bibendum Corporation | IL | (982) 528-0530 |
| Brian Rogers | Augue Incorporated | IN | (330) 149-2168 |
| Caleb Stanley | Dolor Dapibus Foundation | IN | (281) 749-1290 |
| Nerea Burks | Diam Eu Inc. | IN | (935) 383-5109 |
| Nola Fox | Convallis Incorporated | KS | (240) 198-8442 |
| Breanna Hensley | Molestie Sodales Mauris PC | KS | (768) 894-1014 |
| Cade Warren | Vivamus Company | KS | (907) 927-9101 |
| Ashton Shields | Justo Nec Ante Corp. | MA | (410) 919-7180 |
| Kerry Glover | Orci Ut LLC | MA | (225) 582-3169 |
| Wing Barr | Imperdiet Ornare Corp. | MA | (100) 960-0932 |
| Colby Higgins | Nisl Nulla Eu Company | MD | (853) 523-8813 |
| Jarrod Mejia | Non Magna Nam LLP | OR | (183) 330-4780 |
| Jason Dodson | Fringilla Donec Industries | OR | (391) 463-0197 |
| Armando Flores | Nunc Sed Corp. | PA | (493) 415-6745 |
| Lucius Melendez | Per Foundation | PA | (791) 834-5497 |
| Raymond Carey | Mauris A Nunc LLC | TX | (967) 978-8314 |
| Karly Bailey | Arcu Inc. | TX | (340) 489-5617 |
| Kadeem Wagner | Eros Inc. | TX | (365) 676-0320 |
| Colton Rosario | Donec Tincidunt Corp. | WA | (822) 783-9873 |
| Elizabeth Pate | At Libero Inc. | WA | (656) 243-8252 |
| Gabriel Decker | Vitae Incorporated | WA | (704) 639-6926 |
| Eagan Britt | Erat Volutpat Nulla Industries | WA | (193) 960-9539 |

FIG. 12

SYSTEM FOR CREATING A DATASET NETWORK

CROSS REFERENCE TO RELATED APPLICATIONS

This application is a continuation of PCT/CA2020/051595 (filed on Nov. 23, 2020), which is related to provisional application No. 62/939,504 (filed on Nov. 22, 2019) and 62/939,515 (filed on Nov. 22, 2019) all of which are herein incorporated by reference.

TECHNICAL FIELD

The following relates to networks of datasets, such as data fabrics, a platform for providing such networks, and methods for building and using the networks, the datasets, and the system.

DESCRIPTION OF THE RELATED ART

Traditionally, enterprises have operated in data silo environments. A data silo is a group of datasets that is for example, accessible through one application but isolated from the rest of that organization. Data silos are usually a result of data being collected by an analytics tool or data generated by a business application. There are many disadvantages to a data-silo environment.

For instance, data silos can result in large amounts of wasted time within an organization. Rather than being able to automatically streamline data across applications, data is isolated within each of the applications. This means that a team may have to wait until they realize they need data they do not have, find where the data lies within the organization, manually gain access to it, and then analyze it for their own purposes. By the time they collect the data, it may no longer be valid.

Data silos may also result in wasted storage space. For instance, if each employee of an organization needs a copy of the data, and saves it to their company storage folder, that will waste a large amount of storage space, which can be very costly.

Another disadvantage of a data silo environment is the inability to maintain the accuracy of data. As isolated data is sitting, the more likely it is to become outdated and, thus, inaccurate, and unusable.

Data silos may also create security vulnerabilities. For example, once data has been copied, the owner of a dataset can no longer guarantee its confidentiality without a difficult and costly process that relies on compliance from other teams. If a copy of the dataset is stored on each teammate's computer, then it may be more likely to be hacked.

Data silos also create friction within an organization since in a data-silo environment, each team only has access to their own data, so that is the only data they work with. For example, each team may work independently, as opposed to collaboratively, creating a divided organization.

FIG. 1 and FIG. 2 show the traditional creation of each new custom application involving the creation of a new data silo 24 and the duplication of data 26. As shown in FIG. 1, a traditionally developed application 10 would each be programmed to include its own user interface 14, API 15, (not pictured in FIG. 1), security and controls 16, data integration 18, data persistence 20, and data publishing 22 capabilities.

Furthermore, each application 10 requires its own database 24 with linked or related data 26 in the database 24 being created, imported, updated, maintained, etc. Legacy data 28 from the enterprise would also need to be separately imported into each application 10. Users 12 would be granted access to each application 10 using separate security and controls 16. Data may then be published into a larger enterprise data lake 30, e.g., for performing analytics and other data processing operations. These applications 10 also can rely heavily on desktop tools requiring hundreds or even thousands of instances of these tools required to effectively deploy a new solution. Moreover, it has been found that traditional data silos often lack sufficient data controls, and controls implemented in one application or data silo is often not reusable in another.

Due to these inefficiencies and redundancies, creating new applications 10 and solutions often takes many weeks and more often months to deploy. In environments where these solutions are needed rapidly, the time to deployment can be considered a competitive disadvantage, or at the very least a drain on resources.

SUMMARY

One aspect pertains to a system for creating a shared network of data nodes. The system comprises at least two nodes; each node having a dataset containing version-controlled data; an access controls layer limiting user access to the dataset; a metadata layer defining characteristics of the dataset and connecting to another node. One or more links are created to associate the node with the subsequent node to create the network of data nodes such that a change in the dataset affects a change in the network of data nodes; and the network of data nodes comprises a query layer to interact with the dataset and the subsequent dataset. Each data node is self-describing, self-connecting, and self-securing.

BRIEF DESCRIPTION OF THE DRAWINGS

Embodiments will now be described with reference to the appended drawings wherein:

FIG. 7A is a schematic diagram of a platform for building dataset nodes, building networks of dataset nodes, and for interacting with such networks;

FIG. 8a is an example of a screen shot of a node and its data;

FIG. 10 is a schematic diagram illustrating different user perspectives when interacting with an example data network;

FIG. 11 is an example of a screen shot of versioned data;

FIG. 12 is an example of a dataset showing independent access control grants;

DETAILED DESCRIPTION

The following provides a platform for creating a shared network of data nodes. Each data node is self-describing, self-connecting, and self-securing. The data network taught herein can reduce the time and effort required to build large-scale (e.g., enterprise-level) data management solutions. Some advantages include: prevention of data silo environments; flexible enterprise alignment through an adaptable application programming interface (API) integration layer; and simplified data integration based on reuse of data across applications with minimal effort, effectively reducing or eliminating the need to develop "applications" in the traditional sense. Each node has: a dataset containing version-controlled data; an access controls layer limiting user access to the dataset; a metadata layer defining characteristics of the dataset and connecting to the another node. One or more links are created to associate the node with the subsequent node to create the network of data nodes such that a change in the dataset affects a change in the network of data nodes; and the network of data nodes comprises a query layer to interact with the dataset and the subsequent dataset.

As discussed below, this system effectively eliminates the need for application development in the traditional sense, such that the data collaboration network and the individual data nodes in that network eliminate the need for applications by allowing entities with access to the data to utilize the same data without requiring the significant efforts associated with traditional application development and the creation of data silos. Therefore, the system enables faster delivery of solutions by decoupling data from the UI and allowing for the configuration of security and control layers around the data, rather than having to write one off code for each solution or application. Moreover, the data collaboration networks within separate organizations can be linked to each other to create networks of networks, creating a super network of linked data, rather than isolated data silos.

Figure 2:
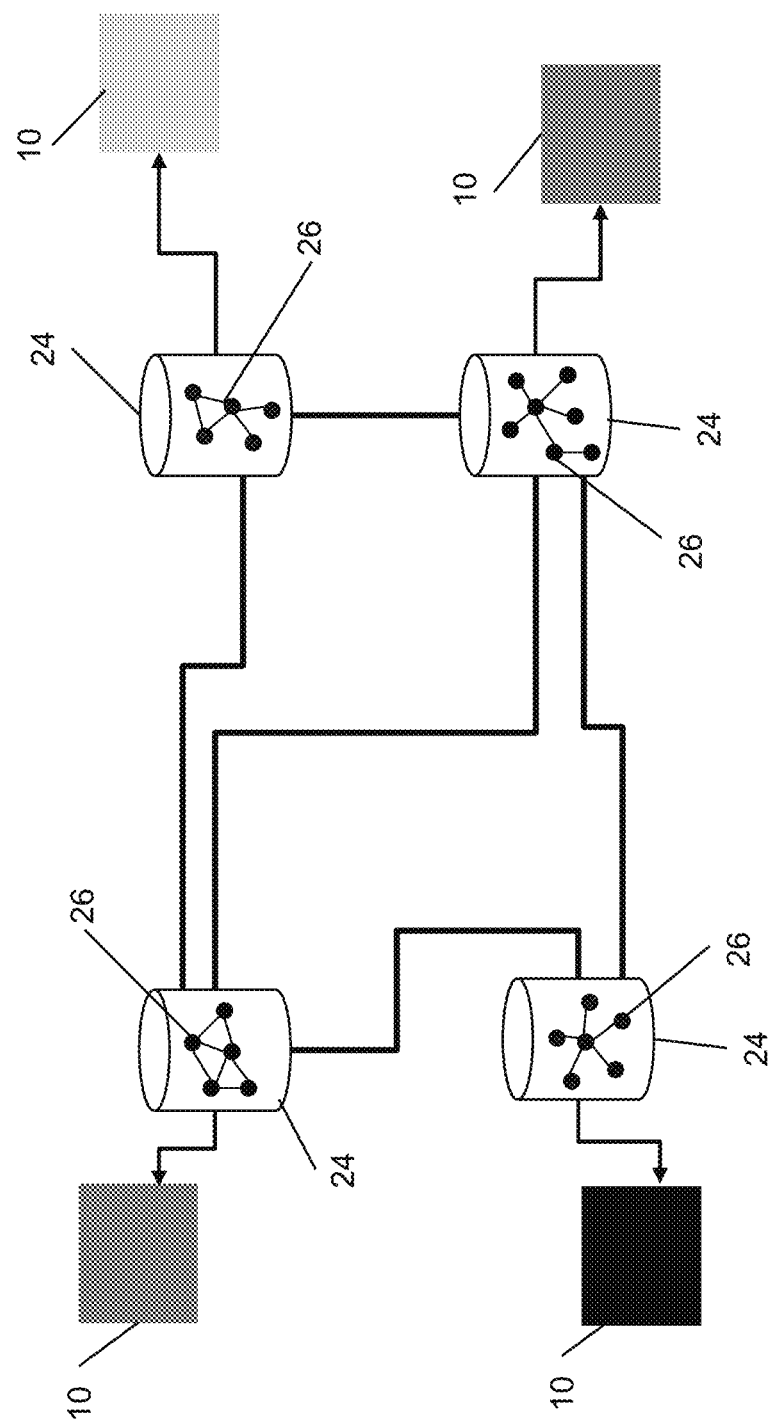
FIG. 2 is a schematic diagram illustrating prior art application development in data silo environments.

FIG. 2 shows the traditional creation of each new custom application involving the creation of a new database 24 and the duplication of data 26. Each of the traditionally developed applications 10 would require their own databases 24 with linked or related data 26 in the database 24 being created, imported, updated, maintained, etc. Each of the databases 24 stores a copy of the data 26 to be accessed by the application 10. Traditional applications have datasets embedded within. Traditionally, data is stored as copies of data in data silos 24 behind individual applications 10. This can cause a data-silo like environment, which can be disadvantageous.

Figure 3:
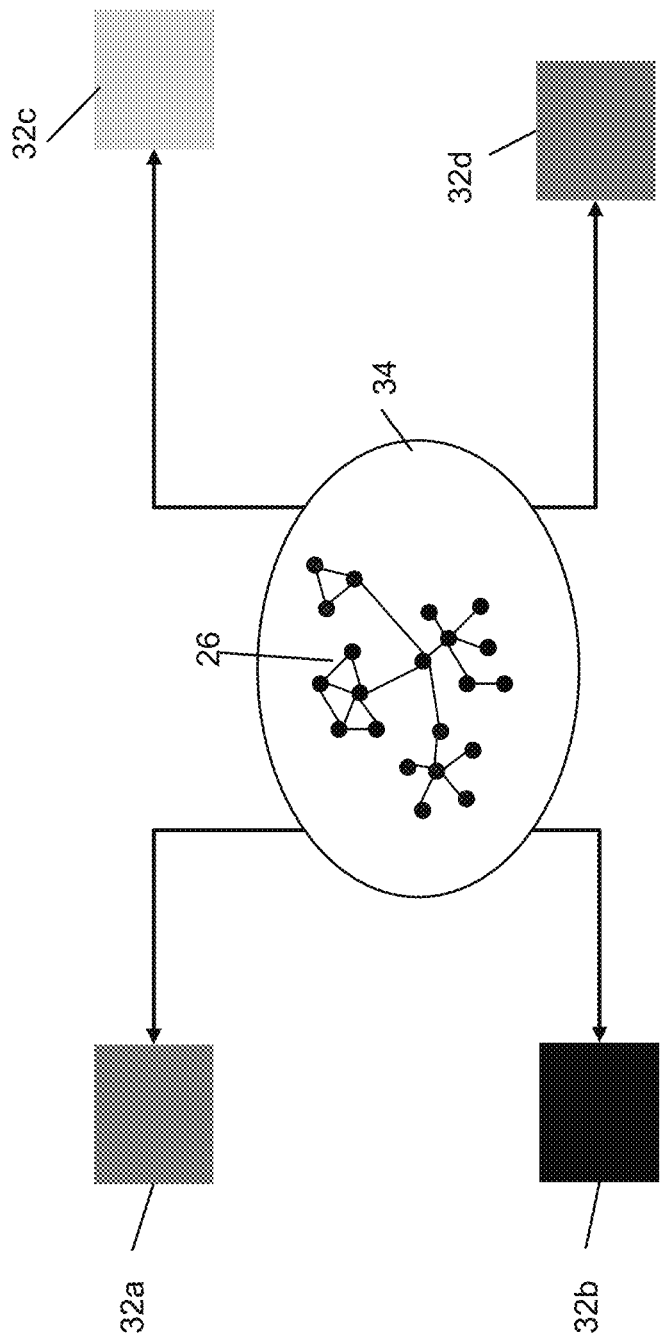
FIG. 3 is a schematic diagram of a network of the data nodes shown with 4 app experiences.

FIG. 3 shows a schematic diagram of the network of data nodes. The data network 34 is created by connecting individual nodes 36 to form a network of data nodes 34. The raw data or record of data 35 is accessible via the query interface 33, which connects to the network of data nodes 34. For instance, FIG. 3 shows four different application experiences 32*a*, 32*b*, 32*c*, and 32*d* all using data from the same data network. This not only eliminates the need to create, import, update, and maintain separate databases, but also eliminates the need to manage each application's security and controls 16, data integration 18, data persistence 20, and data publishing 22 systems.

Figure 4:
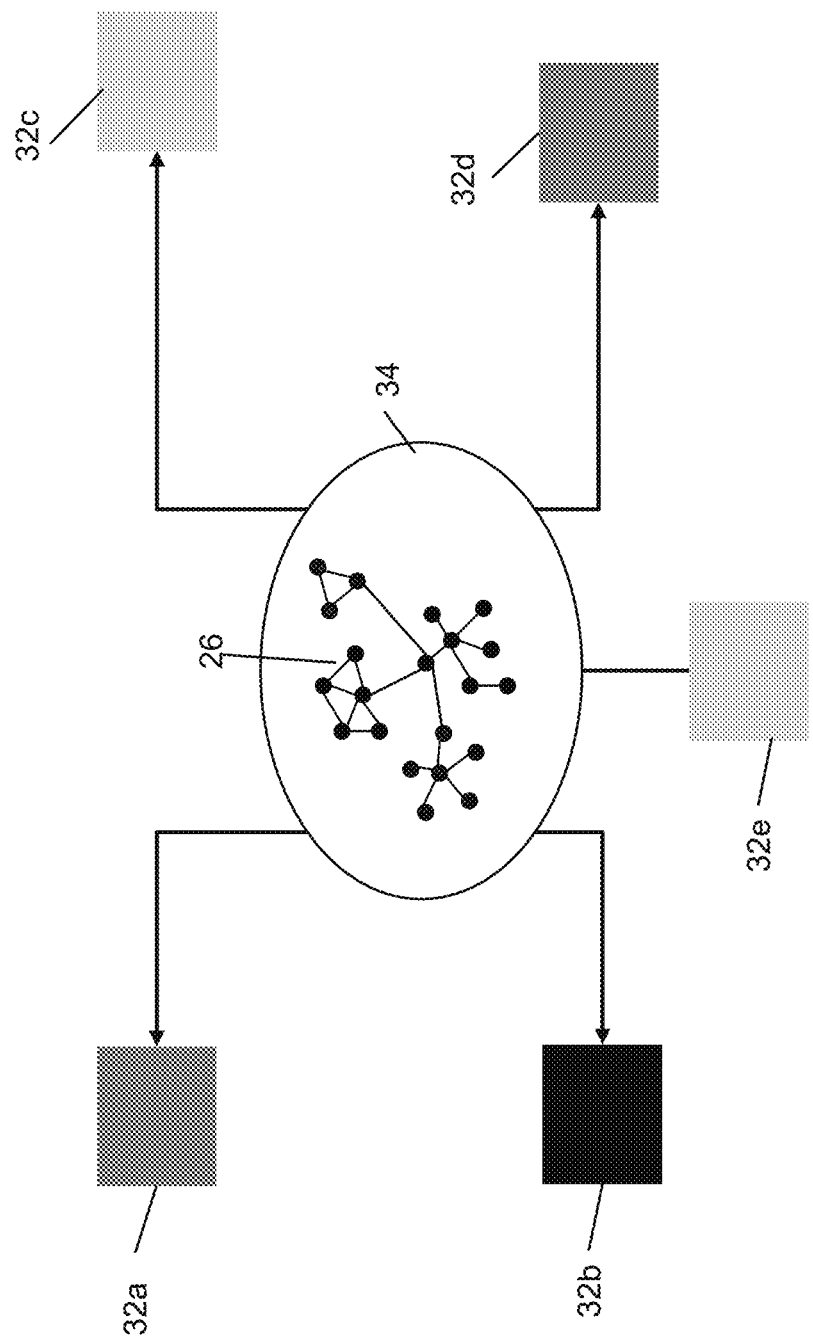
FIG. 4 is a schematic diagram of a network of the data nodes shown with 5 app experiences.

As such, adding a new application experience 32 is relatively easy. FIG. 4 shows a new application experience 32*e* being added to the existing architecture shown in FIG. 3. The addition of a new application experience 32*e* does not require additional security and controls 16, data integration 18, data persistence 20, and data publishing 22 capabilities. The application experience 32 acts as a custom user interface to interact with the data.

Therefore, it can be appreciated that any number of nodes 36, as well as application experiences 32 can be added to the network 34. As newer application experiences 32 are added, the network of datasets 34 grows, and newer links are formed between the new datasets 26.

Dataset Nodes, Networks of Data Nodes, and Platform Implementation

Figure 5:
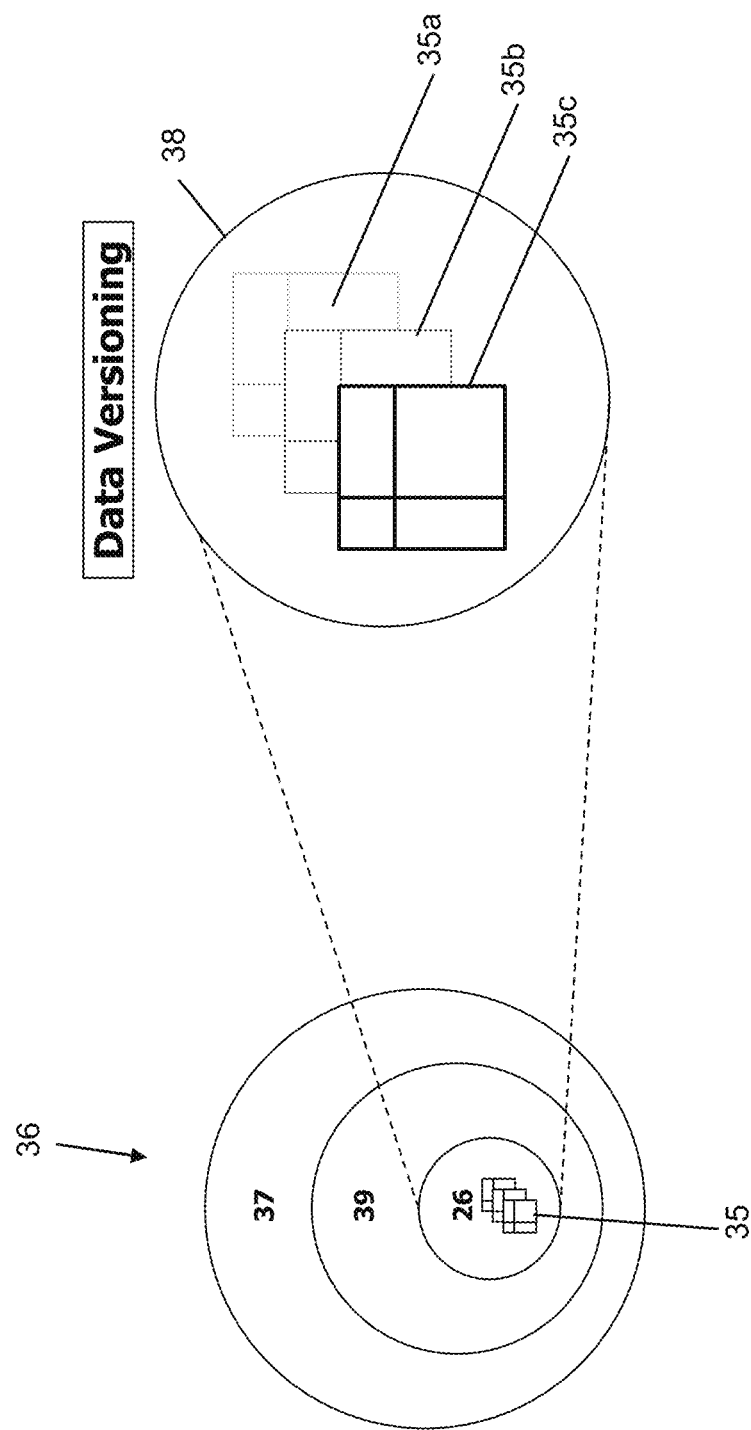
FIG. 5 is a schematic diagram of a node.
Figure 6:
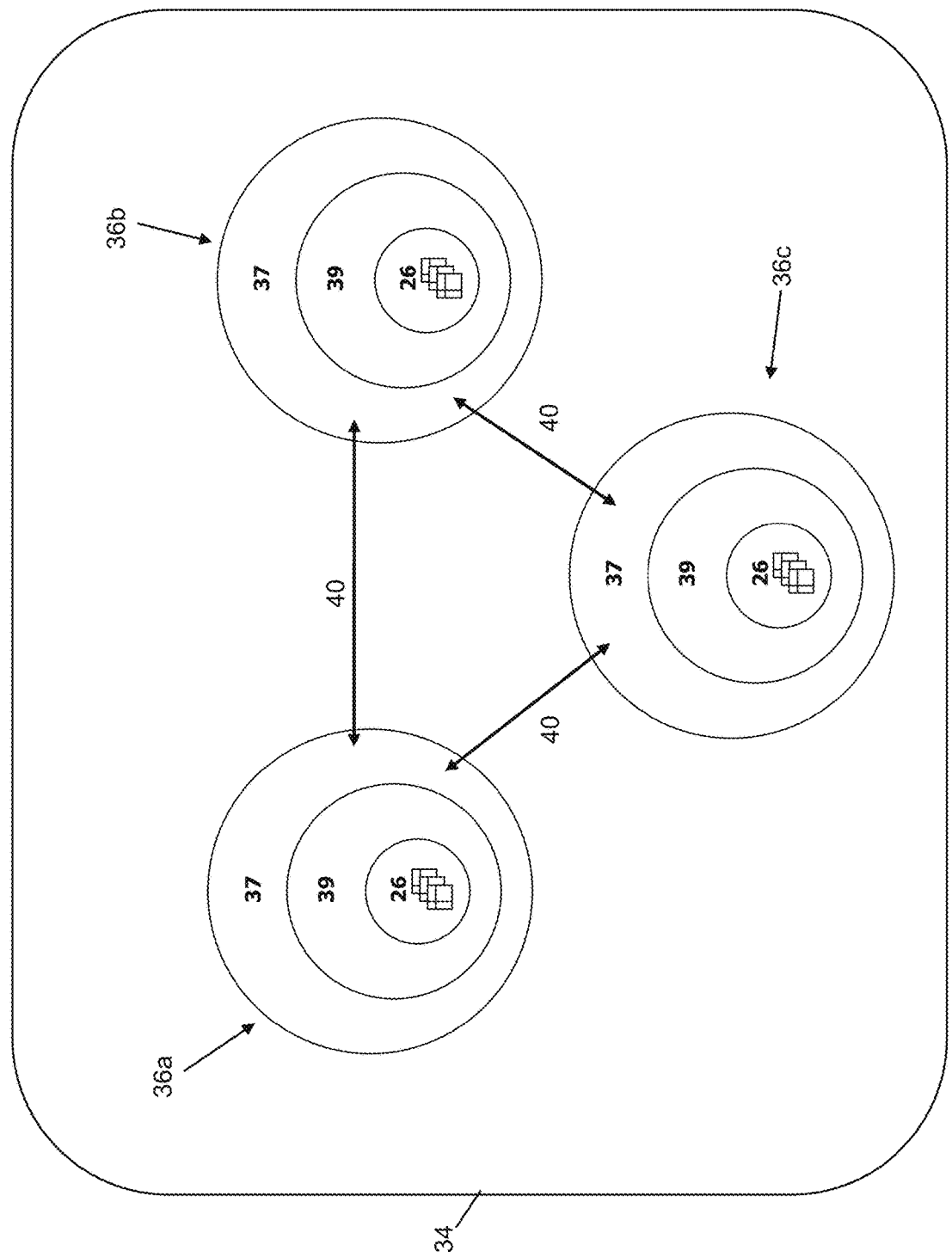
FIG. 6 is a schematic diagram of a network of nodes.

Turning now to FIGS. 5 and 6, the platform described herein is configured to manage data 35 as a network of data nodes 34. FIG. 5 illustrates an example of a dataset node 36, and FIG. 6 illustrates an example of a network 34 of nodes 36. Each dataset 26 comprises data 35. The dataset is version controlled 38 and contains versions of data such as a first version 35*a*, a second version 35*b*, and a third version 35*c*. It can be appreciated that any number of versions are possible. An access-controls layer 39 is built atop the dataset 26. A metadata layer 37 is built atop the access-controls layer 39. As seen with the single node 36 shown in FIG. 5, at a node's core are records of data 35. The records of data 35 cannot be accessed without first going through the metadata layer 37 and the access-controls layer 39. The node 36 comprises metadata layer that makes the node 37 self-describing and self-connecting. Therefore, each dataset 26 comprises its own metadata layer 37 that contains information about the dataset such as properties and information regarding its relationships with other nodes (i.e., links), along with the data that relates any record in the current node with one or more records in other nodes.

Figure 11:
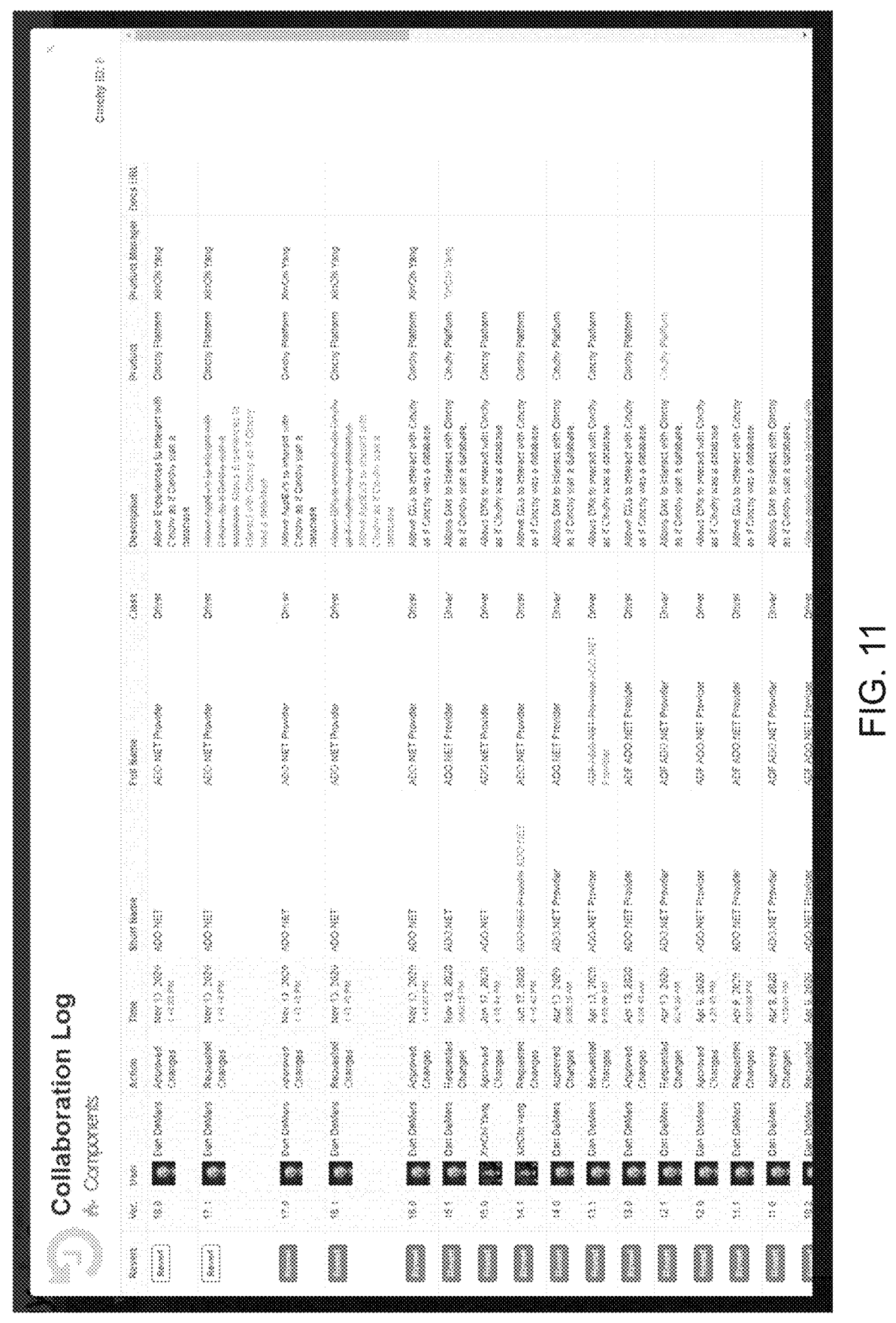

The node 36 can be self-controlling by having a built-in control layer 39 to ensure the integrity of data, and to offer governance controls such as data versioning 38 and change approval. Data versioning 38 is shown in FIG. 11, and described in more detail discussed below. The node 36 can be self-securing meaning that it has a built-in security layer to manage entitlements. The node is also accessible both through the platform's metadata driven user interface or API.

Figure 1:
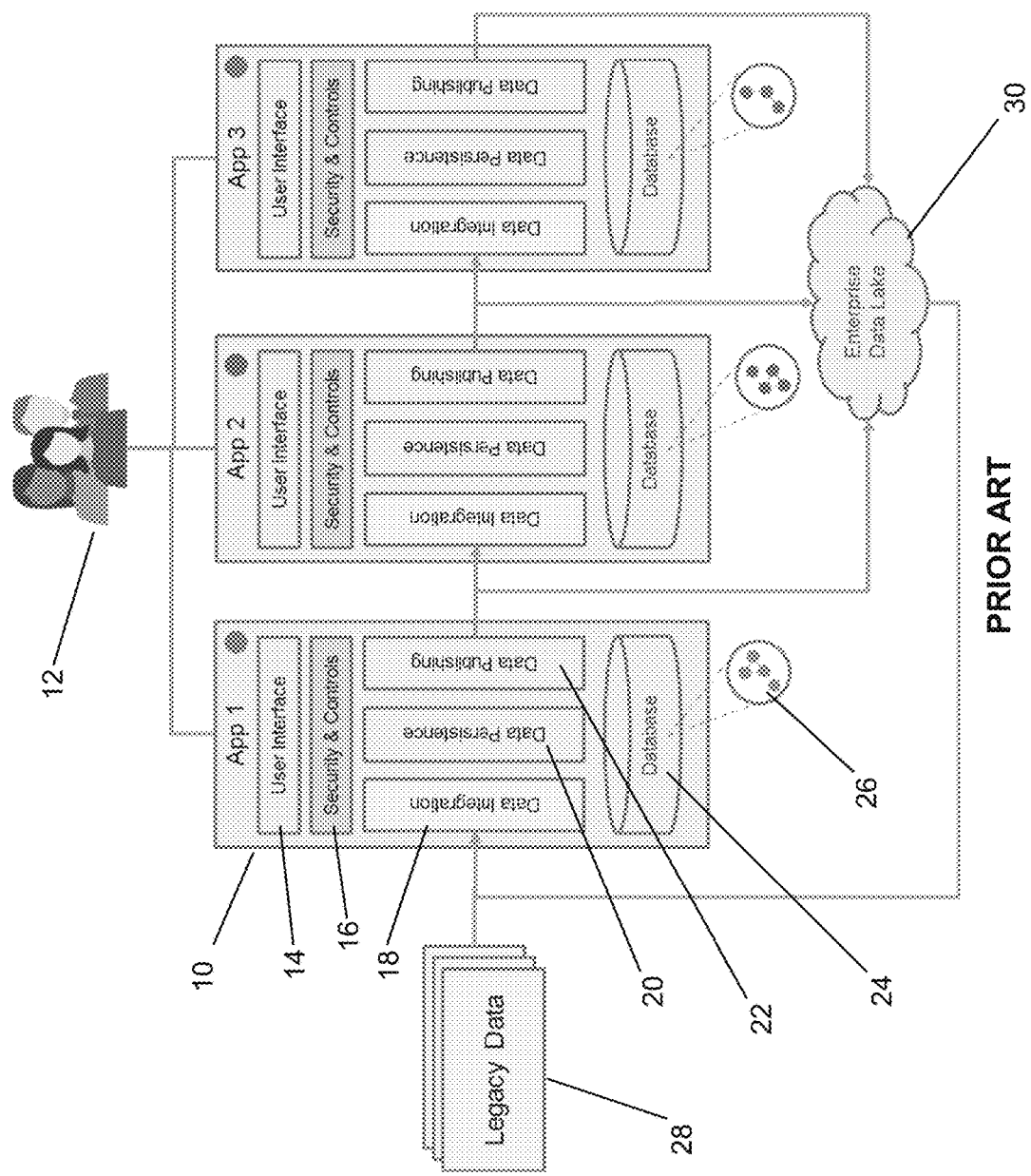
FIG. 1 is a schematic diagram illustrating prior art application development in data silo environments.

Typically, security and controls 16 for data existed in individual applications 10 shown in the prior art example of FIG. 1. This can be dangerous as the security and controls are linked to the individual applications, and therefore would not follow the data when the data is copied. Therefore, the data would be vulnerable or unsecure when copied.

In the system shown by this invention, the security and controls are built-into each dataset 26. It can be appreciated that this is far more efficient and secure because it ensures universal enforcement agnostic of how the data is used. In FIG. 1, if the data is copied across applications as a part of performing data integration, the security and controls do not follow the data, and must be re-implemented by each application. This is avoided as the access controls layer 39 is built as a layer atop the dataset 26.

Turning now to FIG. 6, it can be seen that a first node 36a can be connected to a second node 36b and a third node 36c. This forms the network of data nodes 34. The nodes 36 are connected via links 40, which are relationships between the nodes 36. Links 40 are defined within a node's metadata layer 37, which forms the basis for the network of data nodes 34. Links 40 relate data records 35 within the data nodes, and an individual link 40 has the ability to relate a data record in a first node 36a to one or more data records in another node 36b, 36c.

Since each node 36 is self-describing, self-connecting, and self-securing, the datasets 26 in the network 34 are not limited by an application's boundaries. The data is no longer siloed, as it is in the prior art illustration shown in FIG. 1. This eliminates the need for the application managed databases shown in FIG. 1, creating a simpler and more effective way to use the datasets.

For any individual, their network is shaped by the datasets they have access to interact with. Even the links connecting nodes are only exposed/accessible where the individual has access to the target of a link. It is possible that any user only has access to a small slice of the overall network, as shown in FIG. 10.

By enabling data nodes to be connected to other data nodes, yet remain self-describing, self-connecting, and self-securing, we eliminate the need for data publishing and data integration components shown in FIG. 1 when interacting within the data network. Copies of data do not need to be distributed. Instead, access is granted, and links are established to enable the use of data that may be managed by a different owner.

The platform that is configured to create, modify, and interact with the network of data nodes 34 is illustrated in FIG. 7A. The system has a query interface 33 where the API 41 or the application interface 32 can query the data through. The user 12 interacts with the user interface 42 or the application interface 32 to manage both the configuration of the node as well as the data in the node. The API 41 and the UI 42 can be provided dynamically by the platform itself.

Figure 9:
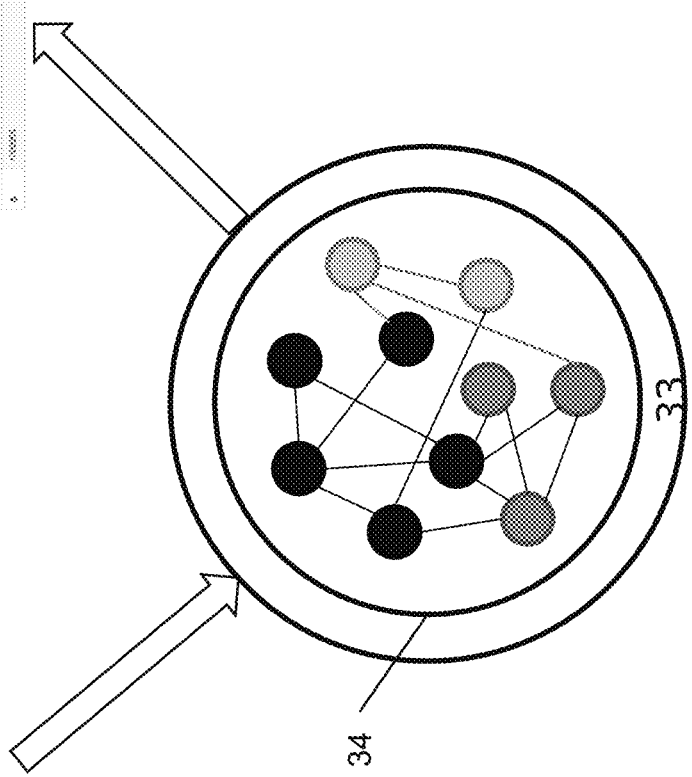
FIG. 9 is a schematic flow diagram illustrating execution of a scripting language query.

The query interface 33 provides a query engine to interact with the network 34 including all the datasets 26 within the network. This enables interactions that go beyond the scope of a single node 36, i.e. beyond what is possible using the APIs available for each node 36. Queries can be written in a platform scripting language, which in one example builds upon SQL and is designed to take advantage of the links available in the network, enabling a user to traverse relationships between nodes when executing queries. FIG. 9 provides an example of a query that leverages a dot notation in the scripting language to traverse relationships when querying a node. The platform's scripting language enables users to read/create/modify/delete data, as well as manage the nodes on the network. Queries written in the platform's scripting language may support ACID transactions.

In an embodiment, legacy data 28 may be imported into the network 34. Connectors can be used to bridge the gap between the legacy data 28 and the data network 34. Connectors can enable the synchronization of data from outside of the platform into self-describing, self-connecting, and self-securing datasets, as well as the reverse flow to push data out to legacy applications or the enterprise data lake shown in FIG. 1.

Figure 7B:
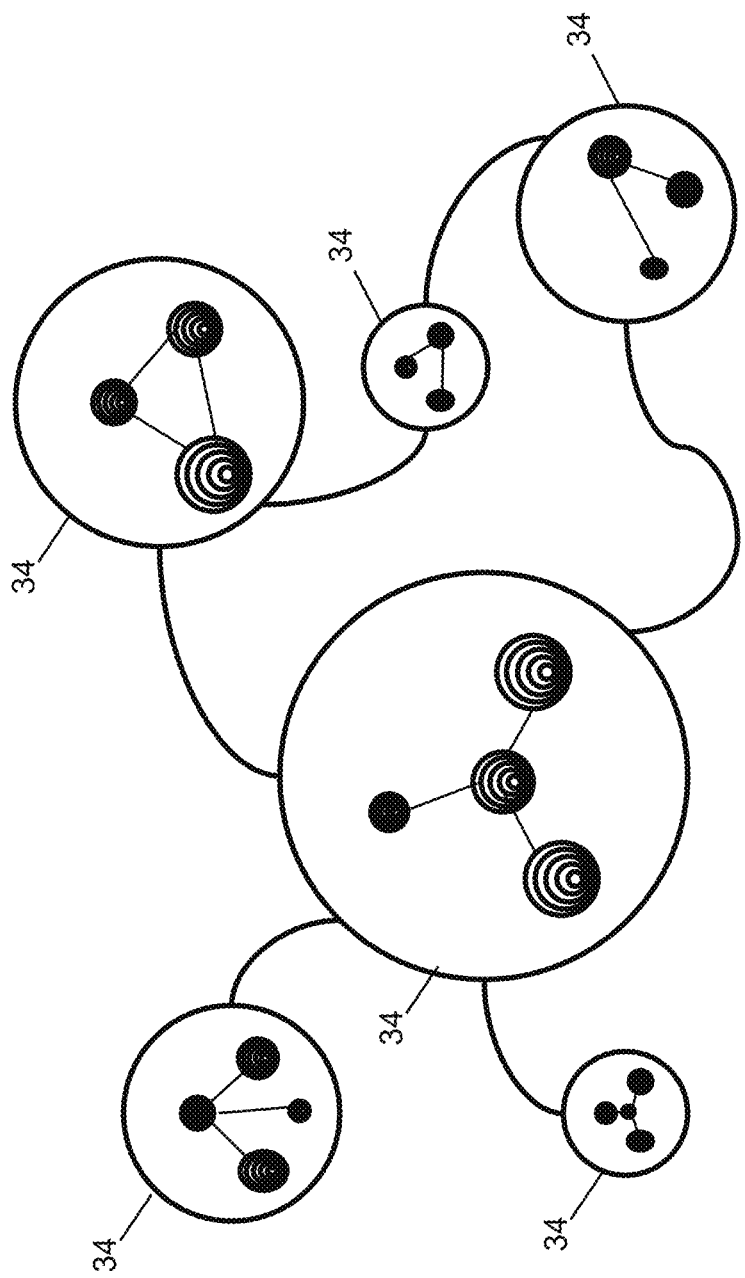
FIG. 7B is a schematic diagram of a platform for building a network of a network of dataset nodes, and for interacting with such networks.

FIG. 7B shows an embodiment where multiple networks 34 are connected to one another. For example, networks 34 within separate organizations can be linked to each other to create networks of networks of linked data, rather than isolated data silos. The network of networks of data is referred to as a super network.

Turning now to FIGS. 8a through 8e, example screen shots are provided to illustrate the user experience component shown in FIG. 7. The user experience 42 can use web forms for creating and managing nodes.

In FIG. 8 there is shown a sample of screens for an example of a node. FIG. 8a is a UI to manage the data in the node. It may be noted that the Primary Client column is a link, and FIG. 8c shows the definition. This experience enables a user to click through to traverse the link to the related record in the linked dataset.

Figure 8A:
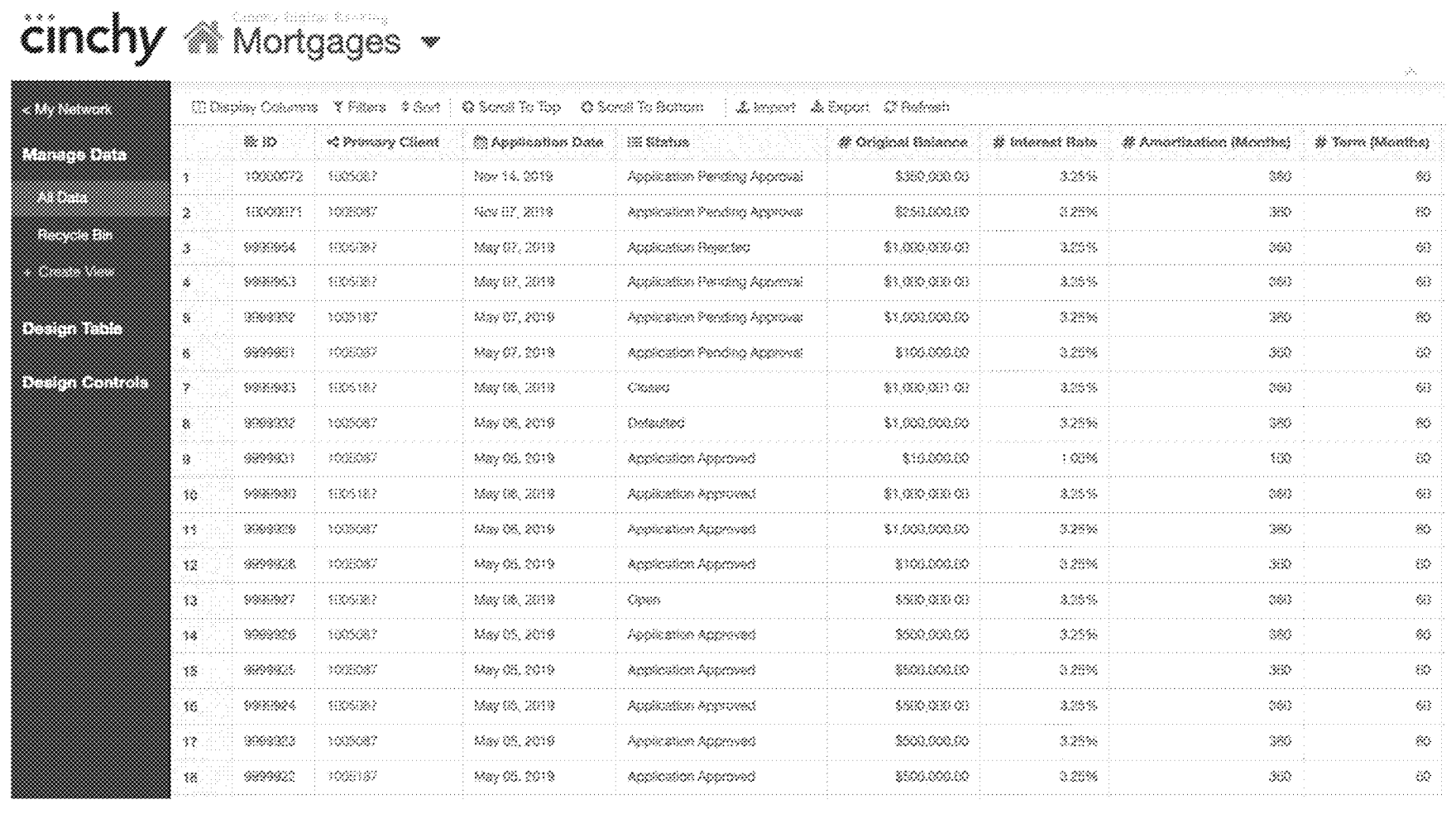
Figure 8B:
FIG. 8b is an example of screen shots illustrating an example of designing a dataset, including the definition of the metadata for that node.

In FIG. 8b there is shown a sample screen for designing the dataset, including the definition of the metadata in the rightmost screen shot.

Figure 8C:
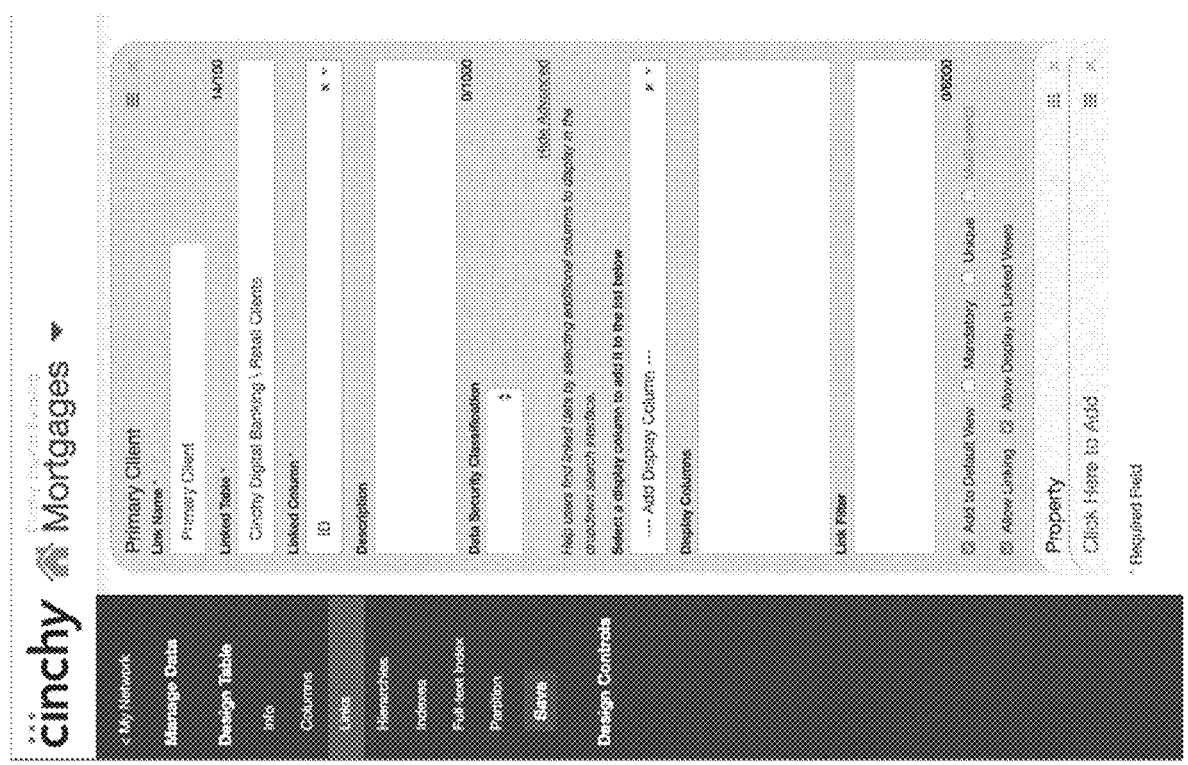
FIG. 8c is an example of a screen shot for defining a link between a current dataset and another dataset.
Figure 8D:
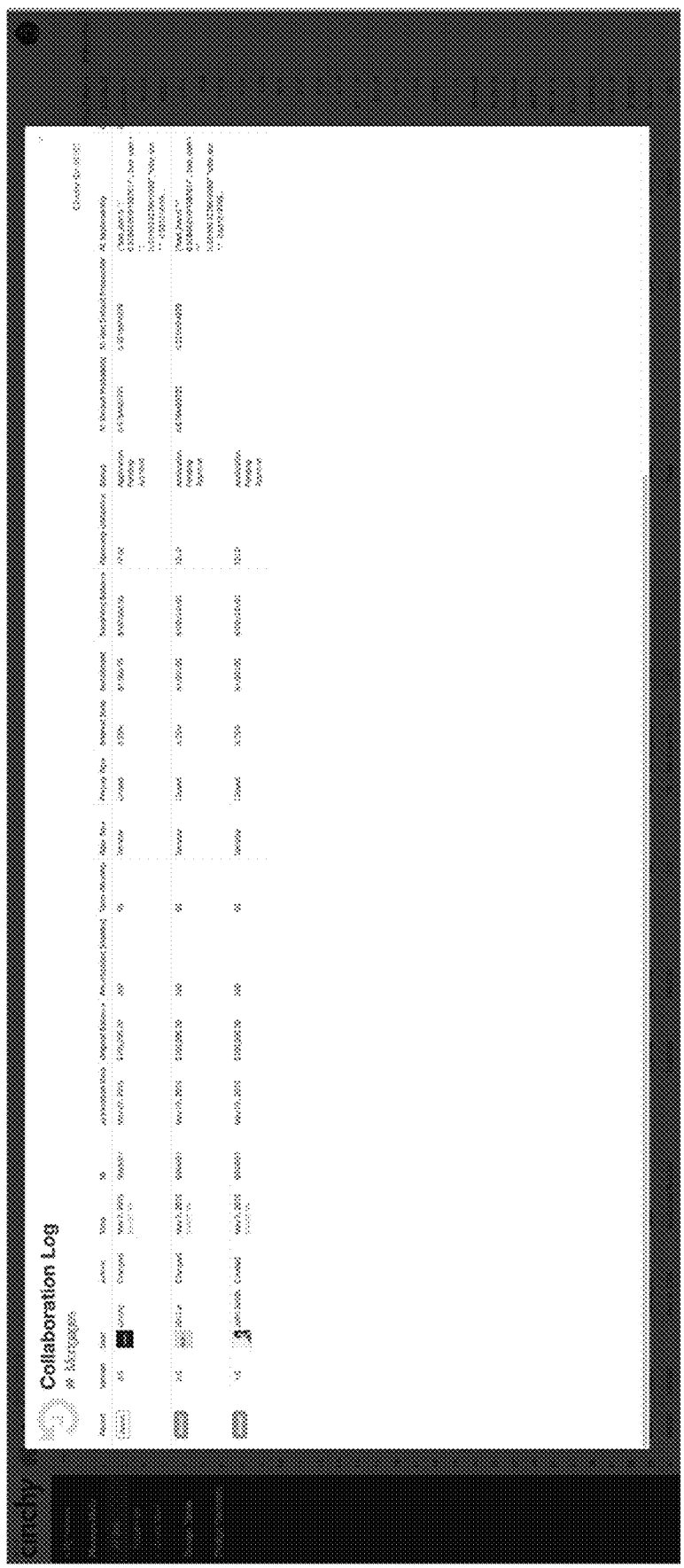
FIG. 8d is an example of a screen shot of a collaboration log that displays versions of the data.

FIG. 8c provides a sample screen for defining a link between the current dataset and another dataset. As shown in FIG. 8d, all data changes in a node are automatically version controlled. FIG. 8d is a sample screen of a Collaboration Log that displays the versions of data.

Figure 8E:
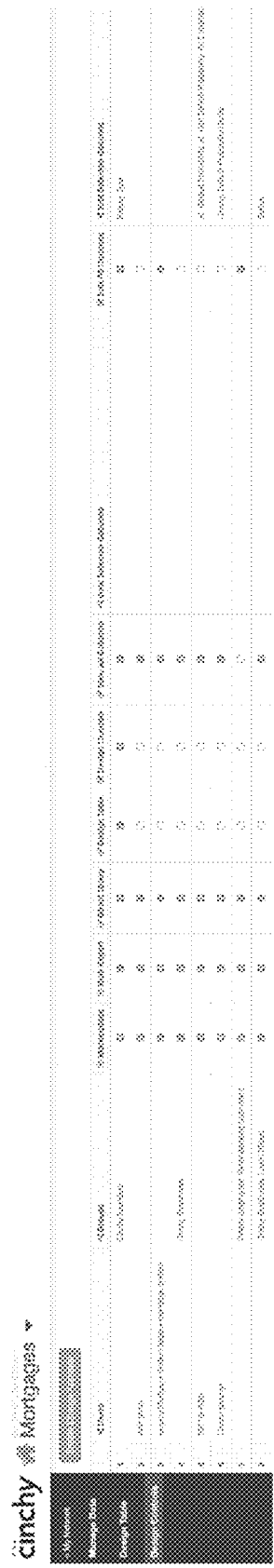
FIG. 8e is an example of a screen shot of a controls page that can be used to configure controls on an individual node.

FIG. 8e provides a sample screenshot of the Controls that can be configured on an individual node.

The platform therefore provides a native metadata driven user interface for users to interact with the data network. This, coupled with the ability to create custom application experiences, provides a replacement for the need for Applications in the sense illustrated in FIG.

As indicated above, FIG. 9 provides a sample of a platform scripting language query that is taking advantage of the links that exist between nodes to traverse the data network 34 and retrieve data. Specifically, a dot notation can be used to obtain a query result, by using the query interface 33 provided by the platform.

Data Versioning

Data versioning 38 in the platform can be performed on the data. FIG. 11 shows data versioning of a single record. A first version may represent the initial creation. Subsequently, new versions may be created each time the dataset is changed or altered. For example, Version 18 approved the changes performed by a user named Dan Demers on Nov. 13, 2020. Each version captures the details of the user that made the change along with the timestamp of the change.

For example, in one version a user can delete a record of data, this will show as grayed because it is a deletion. In another instance, a user may restore the record of data from the recycle bin, this will show as a restore performed by the user. In another instance, a revert operation can be performed by a user, to restore a first version of the dataset. This will create a new version, and it does not impact the version history.

Data Level Access Control

FIG. 10 provides an illustration of how two different users (User 12a and User 12b) see the same network of data nodes. Here there are two different users 12a and 12b, who are interacting with the data network 34 via the query interface 33. The black links 40 and nodes 36 represent datasets 26 that the user has access to. For either individual, the gray nodes and dashed links are unavailable, it is as if they do not exist at all. This means that each user has their own perspective when looking at the data network 34, and it may look very different for each.

The partially filled nodes represent the fact that a user may only have access to a subset of the data within a node 36, subject to rules that have been configured. The access controls layer 39 built-on a node 36 can be very granular and define rules that enable a user 12 to view/edit/approve data under certain conditions. FIG. 12, discussed below provides an example of data driven access entitlement.

Turning now to FIG. 12, datasets can support very granular access controls. In FIG. 12 is an example, which is showing two independent grants defining what a user is able to edit. One of these grants has conditions based upon the data in the current node. These conditions can span nodes as well, leveraging the links to traverse related datasets to determine whether a user has access. Similar granular controls are available for what a user can view or approve. In this example, the grayed out cells would not be editable by the user.

The networks of nodes are linkable via any application that is configured to utilize and interact with the platform. The network is an interaction of the relationships between the data and does not necessarily affect the location of, or exact device used, to store the data in the underlying persistence. In this way, existing technology within an enterprise can be used while running the platform over top of this technology, without requiring with adopting one or more new databases.

The network 34 can be built from a series of data nodes 36. The datasets 26 can link to other datasets and queries can be built by applying the scripting language as explained herein. This allows users, such as developers, to build application experiences using existing datasets and by creating new datasets and thus leverages the existing network of nodes and builds upon that network for future application development.

It may be noted that a newly created node can have data added and manipulated by the user, and/or can import existing data, e.g., legacy data. In this way, new nodes can be added to the network using an enterprise's existing data, e.g., from a legacy application or data storage component. Nodes can be user managed, synchronized, and/or application managed and any particular node can have individual attributes or sets of attributes that are user managed, or synchronized, or application managed. That is, a node can be controlled and managed on a per attribute basis. More specifically, records in one node can be linked to one or more records in another node.

An enterprise environment may not only build solutions quickly by reusing existing queries and nodes, but also continues to enhance and add to the data network as new data is created or imported for the newly built solutions.

The configuration and various components of the platform enable several unique features that improve upon the way enterprises and other users of data build solutions. By providing a network of data nodes 34 as shown in FIG. 6 and providing data-layer controls and interfaces to that data network, solutions can be built with less effort and at greater speed than traditional approaches that replicate these capabilities in data silos.

In prior approaches, each solution is implemented as a separate application 10 that requires a separate database 24 for persistence (see FIG. 1). In contrast, the system described herein provides a single platform to manage data for multiple solutions. Using the platform, persistence can be provided to solutions over APIs. Because of this structure, data can be reused across solutions without data integration required for each solution individually. This reduces the infrastructure burden, particularly when creating many solutions.

It is recognized that traditional databases are designed for use by a code which is written by a development team. This code generally runs under an account for the application 10, not separate accounts for individual users 12. That is, access controls in traditional application development environments are typically not robust enough to allow a single database to be used by multiple teams for multiple applications 10, each with multiple users 12. To overcome this limitation, the system described herein provides data access controls that limit what all users (including developers) are able to see and edit. The security layer of the platform applies these controls so that each user 12 sees a slice of the data network according to what they have access to.

In prior approaches, while data change auditing could, in theory, be implemented in application code as a generic capability for all data within the application, in practice it rarely if ever is. Typically, developers of applications 10 build a separate "audit log" table to store changes for specific datasets of interest. However, changes are not universally captured for all datasets, and is often not recoverable through a systematic approach when an audit log is available. In the presently described system, the platform is configured to perform automatic data versioning of each individual record, with the ability to roll-back to previous versions. This reduces application development efforts and is guaranteed to apply to all data as opposed to having to compromise because of an effort cost/impact. Automatic data versioning also simplifies the data model by avoiding user-defined control attributes (e.g., creation time, created by, etc.).

The automatic data versioning applied by a data versioning module of the platform can be performed by storing all data changes in a way that allows both viewing of prior versions, differences from version to version, and the ability to revert back to a specific version, by reapplying the change back, even in scenarios where the schema of the table has changed.

In prior approaches, the ability to restrict who can see and edit data is implemented by each application 10 in application-specific code (see FIG. 1). This application-specific code is written at the application/function/feature level, not the data layer. As mentioned above and shown in FIGS. 5 and 6, the platform has data access controls defined at the data node level, and solutions are forced to automatically respect those controls. As shown in FIG. 9, execution of a scripting language query used by the platform utilizes access controls metadata to execute the query engine such that the query results pulled from the data network are limited to what that particular user has access to.

This data layer access control reduces application development efforts by eliminating the need to create access controls for each and every application. Moreover, there is a consistent enforcement of controls (e.g., a single user accessing the same data through multiple applications) across all access channels (e.g., API, UI, etc.).

In prior approaches, links between records in databases 24 used by applications 10 are implemented by copying the column values and/or using surrogate keys. In the presently described system, the platform provides the ability to link a record in one node to one or more records in another node, agnostic to the attributes and attribute values. Also, the platform provides the ability to use the links in queries. This simplifies the data model by unifying physical and logical models and avoids a dependency on manually defined surrogate keys. The linking performed using the platform also simplifies queries by avoiding what would normally require complex joins.

The linking can be performed by the platform storing the links between records separately from user-defined columns. A separate table can be used, which includes a mapping of these relationships, in a way that is agnostic to user defined columns. It can be appreciated that this linking mechanism is only for illustrative purposes, and the exact implementation would vary depending on the type of underlying persistence.

The query engine can execute the platform's scripting language by generating the underlying persistence language, e.g., SQL, and if applicable explodes the "dot" notation (shown in FIG. 9) and converts from model to logical. The data may then be converted from logical to physical and access controls applied such that only approved data is pulled from the underlying persistence. The underlying persistence native query may then be performed and returned.

Traditional approaches to filter data access per user privileges rely on an application-specific insulation layer of security and controls over the data integration, persistence, and publishing interfaces upon the physical database layer. As such, the ability to restrict who can see and edit data is implemented within each application in application-specific code, which is written at the application function/feature level. Such a traditional approach is not application agnostic and requires extensive and time-consuming application development effort.

To address this traditional approach, the platform described herein defines the data access controls at the data layer so that application development time can be significantly reduced while providing consistent enforcement of controls (e.g. a single user accessing the same data through multiple applications) across all access channels (e.g. API and UI) and eliminating the risk of inappropriate access.

It has been found that injecting caching of metadata and entitlements data and incorporating dedicated processing modules and tables to capture entitlements in separate tables within the interaction layer can accelerate performance. The caching protocol described below incrementally can execute a cached transformed query or regenerate the query depending on the changes associated with the access privileges or the query itself, with the changes being reflected in a rapid or near-instantaneous manner. Thus, possibility of undue data access, while new use privileges are being applied, can be eliminated.

The following describes processes for data level access control by managing the entitlements within the interaction layer and then applying them through a query engine to rewrite the queries "on-the-fly" that incorporates access privileges into consideration. This can be done while caching metadata and entitlements data and incorporating dedicated processing modules and tables to capture entitlements in separate tables within the interaction layer.

Change Approval

Another problem addressed by the platform is in designing effective underlying data structures that allow the platform to implement a change approval process in a seamless manner without impacting performance. It was recognized that application queries should calculate results based on approved database changes only, while tracking and versioning pending changes for approval. Existing change approval techniques in prior approaches have been found to not be designed to address the highly unpredictable usage patterns faced by the platform and were therefore determined to be either overly complex or underperforming for the operation of the platform described herein. In addition, such existing techniques were found to be more suitable for a fixed database schema design whereas the platform and its data collaboration network(s) undergo continuous evolution.

It was found that maintaining two separate tables, one dedicated to tracking unapproved changes and another one being the approved master table itself could be used for change approval. Processes within this two-table architecture were run to compare and identify the specific fields that have undergone changes between a master and unapproved changes table, including calculating changes on-the-fly and outside the interaction layer in the application layer. This led to a process based on persisting flags to identify changes for each master data column, which delivered acceptable performance and storage requirement characteristics, and was incorporated as part of the overall architecture of the platform.

As such, there is provided herein a two-table data structure design that maintains two separate tables, one dedicated to tracking unapproved changes and another one being the approved master table itself, to effectively version and track unapproved database changes. This can include the aforementioned persisting flags that identifies changes for each master data column without negatively impacting performance and storage requirement characteristics.

Data-Driven Entitlements

In addition to user/group based column level entitlements that can be enforced by the database consistently across all methods of access (e.g. API or UI), the platform described herein, can also be configured to allow data-driven entitlements. It has been appreciated that without conditions, data would still need to be fragmented and duplicated. For example, if one wants to see the title and name of everyone in the company, but can only see his/her own phone number and address, and only him/her and his/her manager(s) is/are able to see his/her salary. For this information to exist in the same table, the platform applies separate conditions that would allow one to control access based on data within the table.

Column level entitlements can be applied by creating an interaction layer and rewriting queries before being sent to the backend. This combined the user's permissions with the query they are running. While a user's query's "where clause" can be enriched to include any additional conditions, it has been found that in some cases this means restructuring the query completely to include a where clause, e.g. when performing updates. This can however be insufficient for doing data-driven entitlements because a user's entitlements can be based on data that they do not have access to. The platform can run the entire query under the context of that user. For example, if a user only has access to Name and Title in a table with Name, Title, Phone Number, and Address, the platform can apply that user's permissions and limit the data the user gets back to Name and Title. With data-driven entitlements, the platform can allow the user to view all employees where their address is in a particular state or province, when the user does not have access to the address field.

That platform can also be configured to be able to layer together multiple entitlements that impact different columns (e.g., you can see your own name, title, phone number, and address but you can only see the name and title of other employees). By dynamically rewriting the where clause, the platform may be unable to isolate conditions to individual columns. The rewrite logic of the platform can therefore be enhanced to adapt the positioning of the conditions when they fall into this category.

It was also recognized that where there is a link between tables, the controls of the linked table should apply in addition to the controls of the current dataset. This can become quite complex because links could point to other links and thus not only include one additional set of conditions but potentially multiple. Moreover, links support multi-select inside of the platform to allow a one-to-many relationship. In an environment where a user has access to a subset of the data, the platform can be configured to ensure that where there are multiple selections the user only see the ones they are allowed to see. This can further complicate the rewrite logic to dynamically account for these conditions.

To enable data driven scenarios, the platform can also be configured to allow a user inside of the entitlement conditions to access information about the current user and which groups they are a member of. This can be done by extending a query language to support such functions.

To address potential performance issues (because of the complexity that these controls added to the parsing of each request and the final query that is fired against the underlying database), the platform may also implement a custom caching layer that can reduce the number of times a statement is processed by the platform's query engine.

As such, the platform provides a process for data level access control to allow data-driven entitlements by running a re-written query through a system user rather than the current user's credentials, and can layer multiple entitlements together.

Data Sync/Connector Architecture

Extract Transform Load (ETL) tools generally provide components to insert new data or execute a script to clear existing data, whereas the platform described herein intends on creating a data sync which leaves existing data intact and applies deltas to preserve version history. It is intended that the platform do this in a way wherein the data sync architecture was agnostic of the source or target. In this way, simple connectors can be built against an interface to enable the creation of new connectors in a shorter amount of time, e.g., over the span of 1-2 days, regardless of the platform, and have consistency in how the sync operates and the features it exposes.

The first step in implementing a sync is to establish the reconciliation logic. The platform can be configured to implement partitioning, which was found to be relatively more effective by creating a custom algorithm that relies on a custom indexing and sorting strategy. It was found that a bottleneck then shifted to the serialization and deserialization of data when transferring between the sync utility and the web application for the platform. Various serialization protocols can be used, for example Protocol Buffers provided by Google. It is recognized that Protocol Buffers is typically aligned to a fixed payload structure, whereas with the platform, the data moving back and forth may not adhere to a fixed schema. As such, the platform was configured to fit a dynamic structure into that type of a model.

Accordingly, the platform can abstract the source and target out of the sync engine, meaning that when the platform adds a new connector it only needs to have code written for it to transform its data to a standard intermediate format, rather than implementing solutions for each combination of source and target.

Network Growth

Figure 13A:
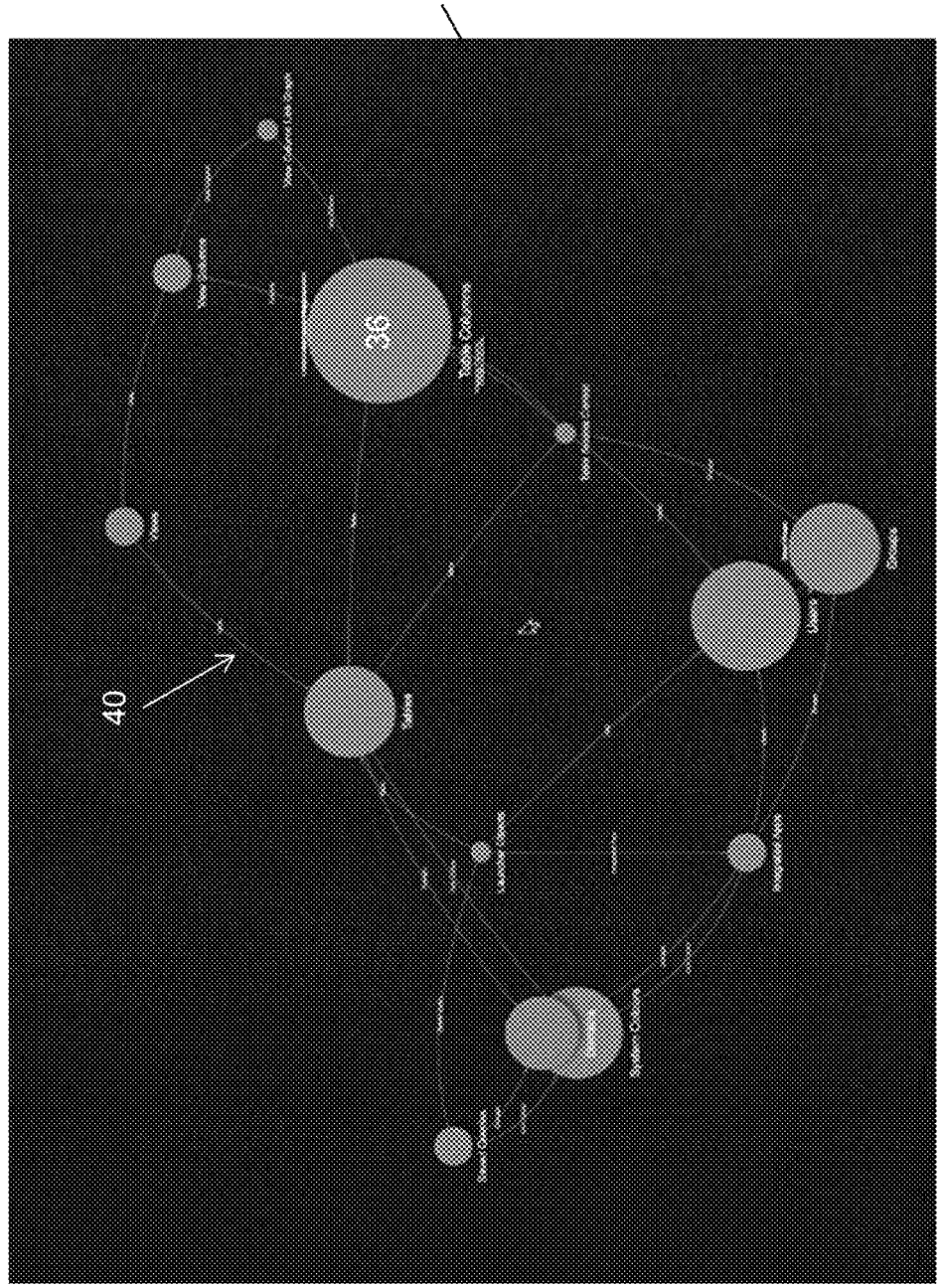
FIG. 13*a* is an example of a dataset network at a first time.
Figure 13B:
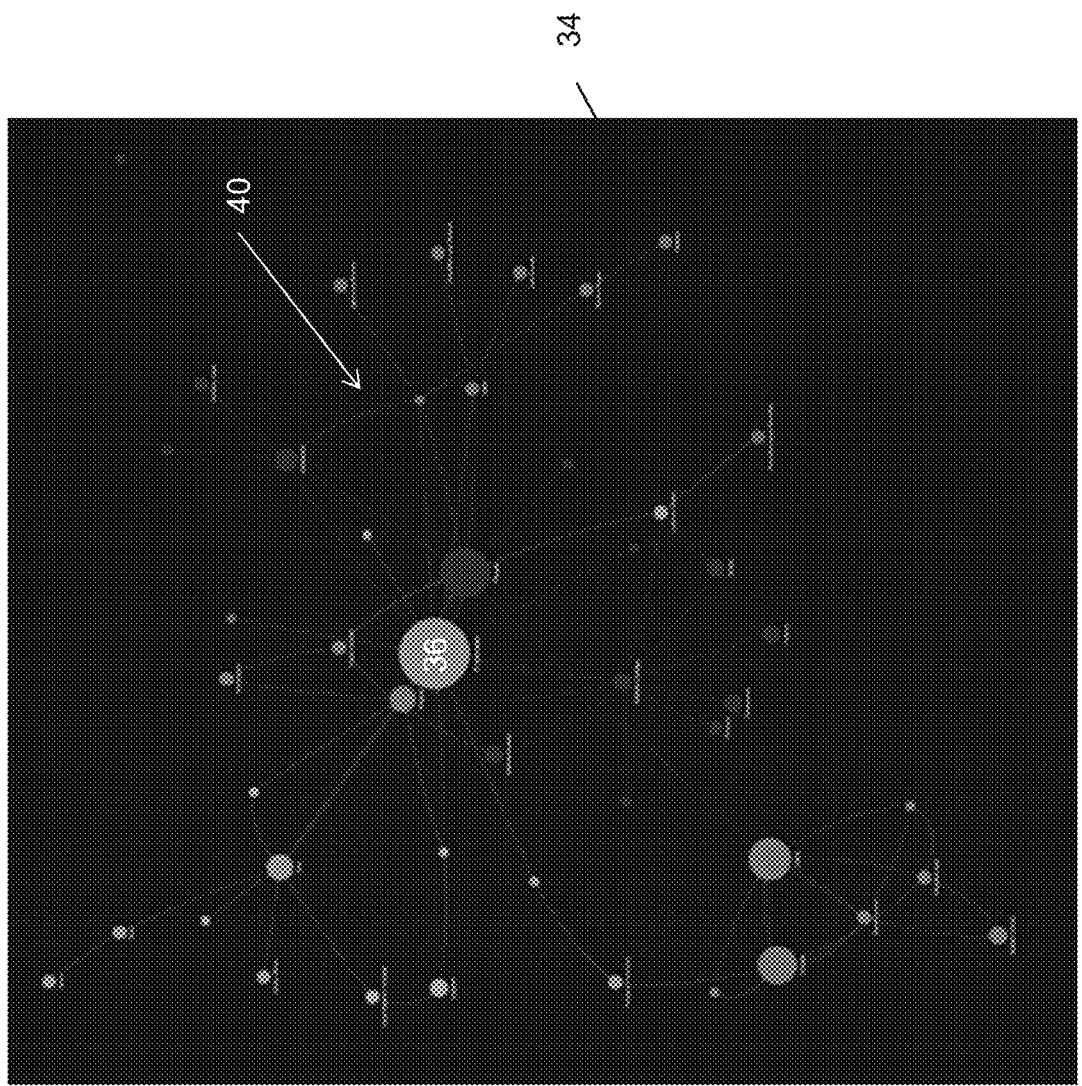
FIG. 13*b* is an example of a dataset network at a second time.
Figure 13C:
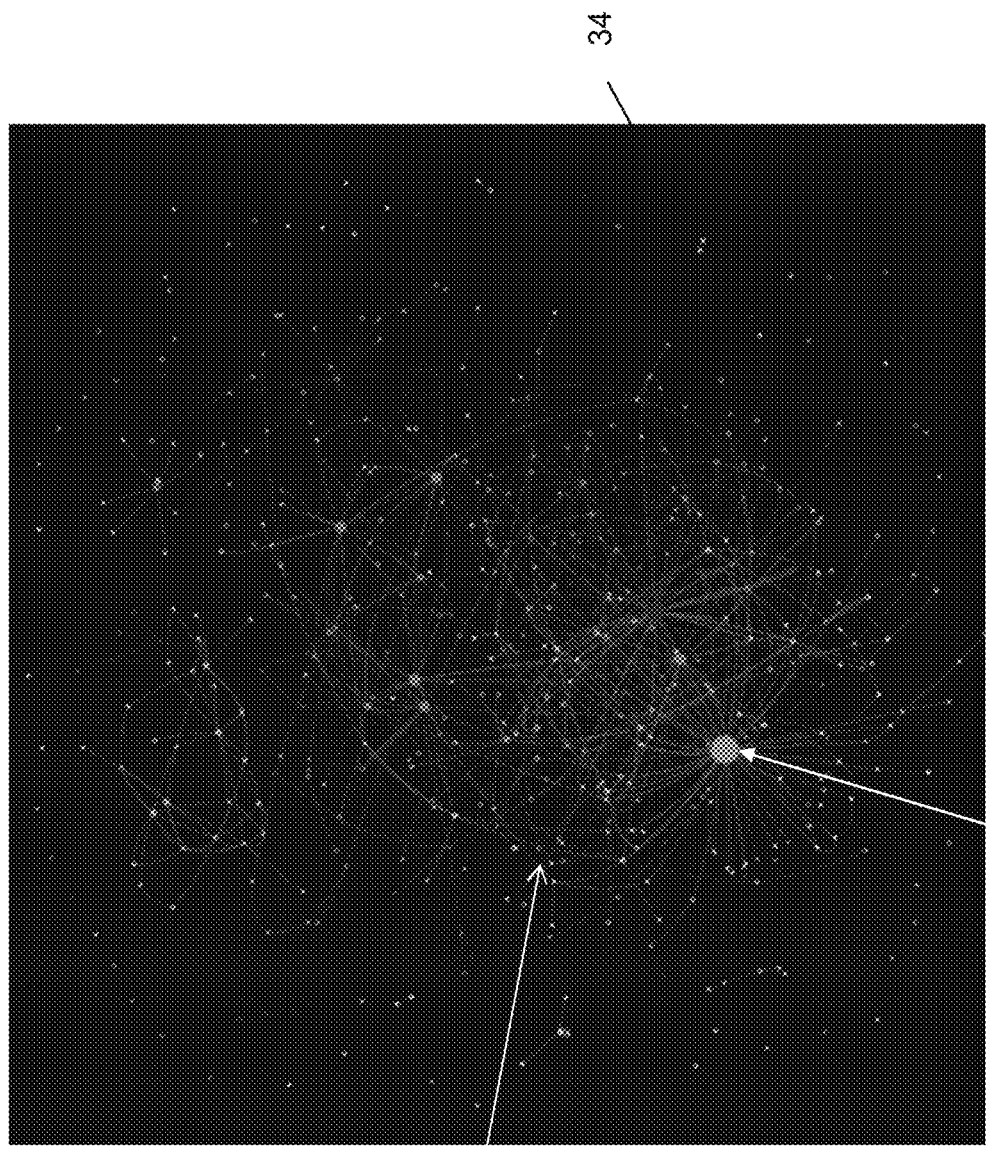
FIG. 13*c* is an example of a dataset network at a third time.

FIGS. 13a-13c show the development of the dataset network 34 through time. Specifically, FIG. 13a shows an 34 dataset network in an early stage, as the data is still being developed. In the early stages, a smaller number of nodes 36 are present as well as a smaller number of links 40 between nodes 36. As the dataset is developed, a user adds more data to the dataset network 34, growing the network. FIG. 13b shows the dataset network 34 in a stage later than the early stage. In this stage, the dataset network has more nodes 36 and more links 40 between the nodes. FIG. 13c shows the dataset network in an even later stage than the stage shown in FIG. 13b. In this stage, the dataset network has a large number of number of nodes 36 and a large number of links 40 between the nodes 36.

Figure 14:
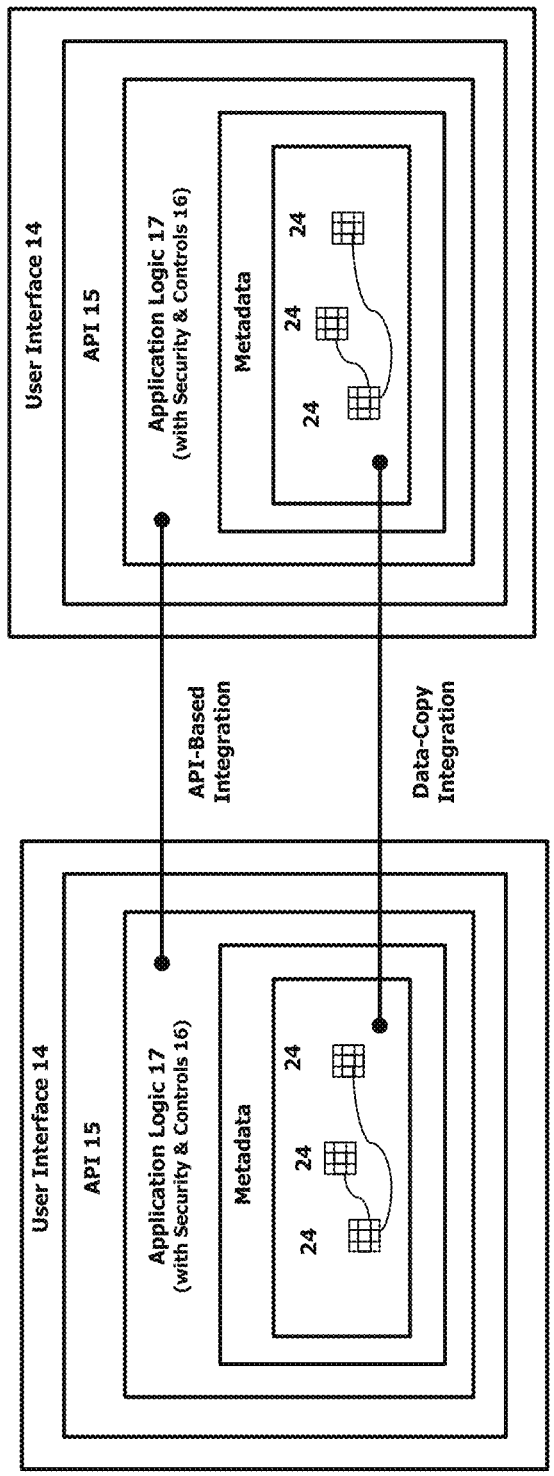
FIG. 14 is a schematic diagram illustrating traditional application development in data silo environments.
Figure 15:
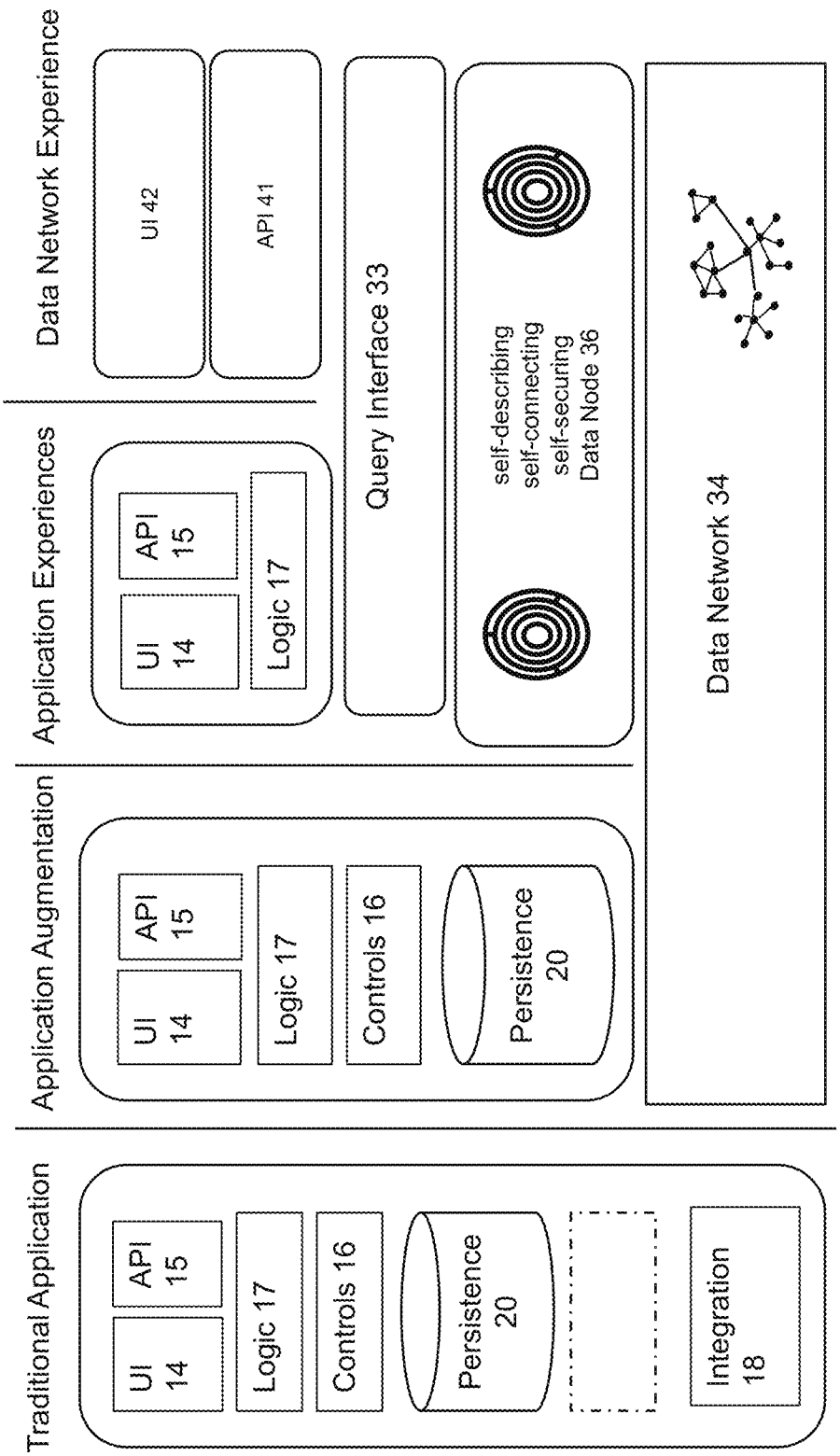
FIG. 15 is a is a schematic view of a traditional application versus a dataset network experience.

FIG. 14 and FIG. 15 provide a schematic view of a traditional application versus a dataset network 34. FIG. 14 and FIG. 15 show a traditional application (or "app") comprising a UI 14, API 15, Logic, controls 16, persistence 20 and is then integrated with the operating system of a computing device 18. On the other hand, the dataset network 34 comprises the nodes 36 that are self-describing, self-connecting, and self-securing. As such, there is no need for a UI 14, API, or integration with the Operating System 18. The API 41 or application experience 32 obtains data 25 directly from the data network 34 via the query interface 33. This eliminates the need to create, import, update, and maintain separate databases. This also eliminates the need to manage each application's security and controls 16, data integration 18, data persistence 20, and data publishing systems 22.

The dataset network 34 does not require additional security and controls 16, data integration 18, data persistence 20, and data publishing 22 capabilities. It is also optional to create a custom user interface to interact with the data, as the query interface 33 is available.

Therefore, it can be appreciated that any number of dataset nodes 36, as well as application experiences can be added to the network 34. As newer applications are added, the network of data grows, and newer links are formed between the new datasets.

Figure 16A:
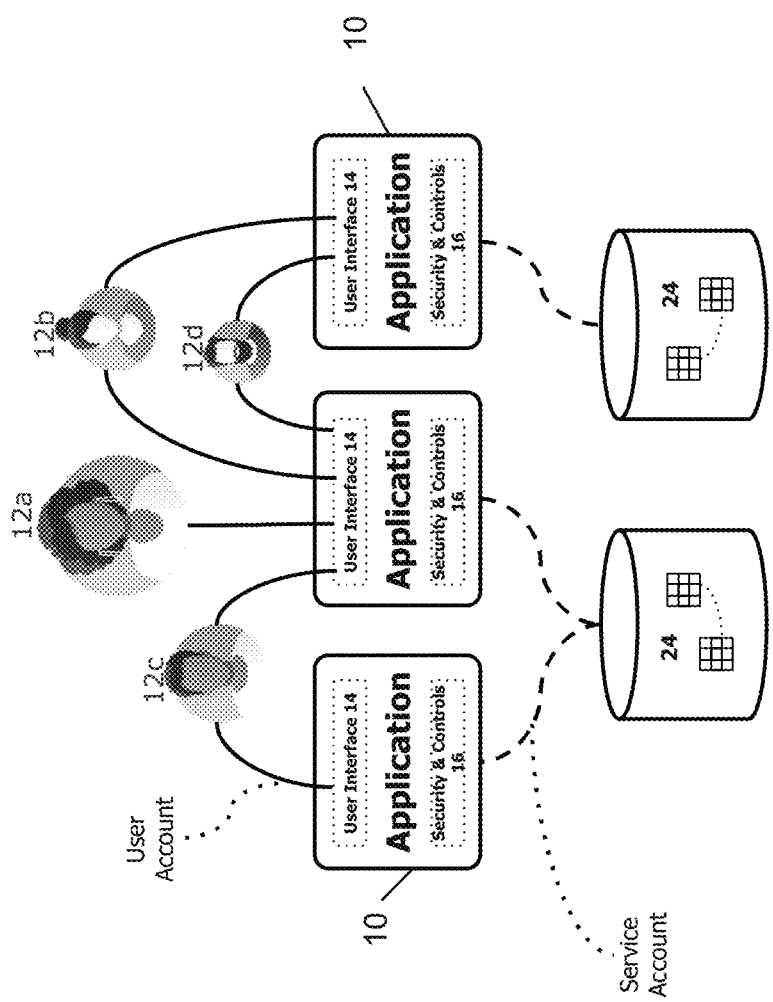
FIG. 16A is a is a schematic view showing security and controls for traditional application development using siloed databases.
Figure 16B:
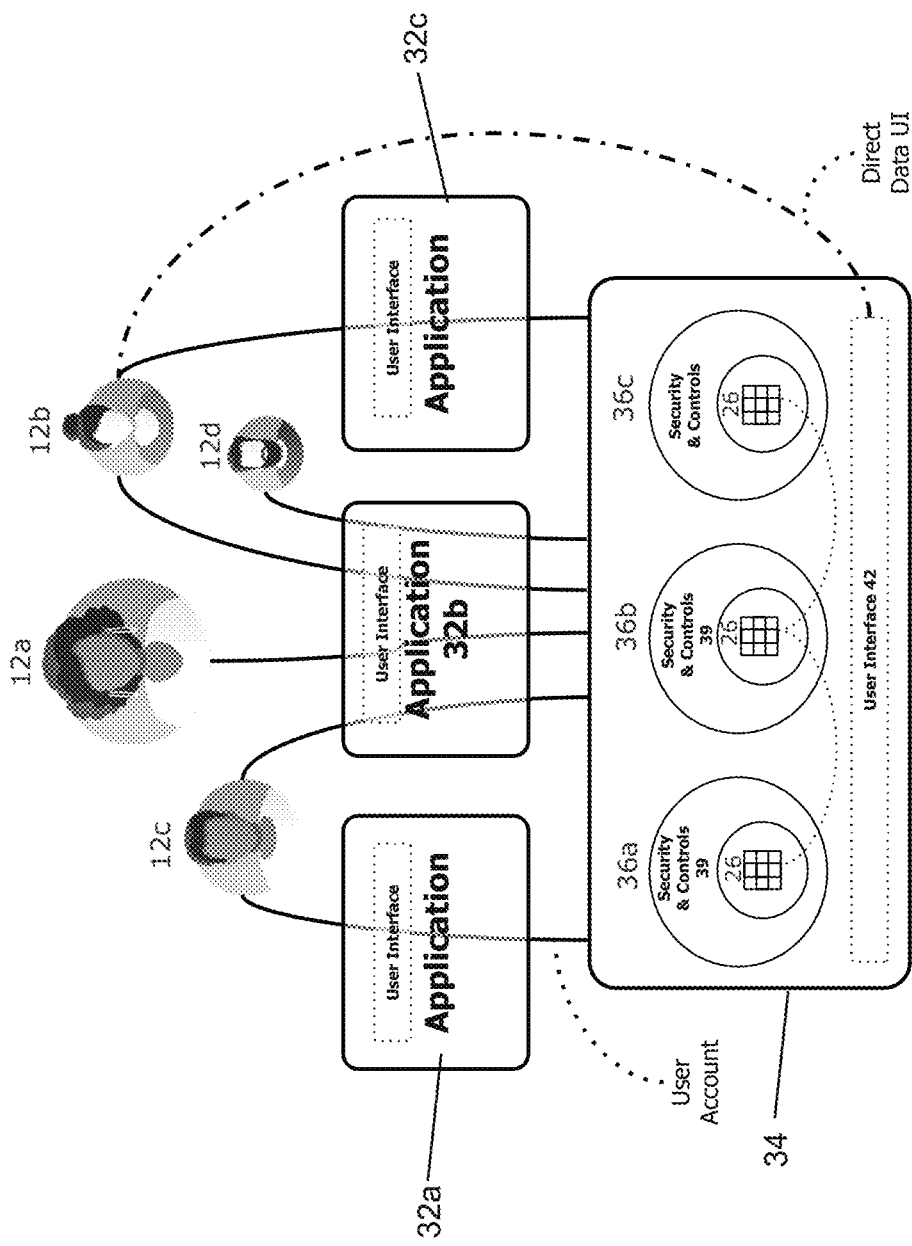
FIG. 16B is a is a schematic view showing for application development leveraging a data network.

FIG. 16A is a schematic view showing security and controls 16 for traditional application development using siloed databases. FIG. 16B is a schematic view showing security and controls via an access layer 39 for application development using a data network 34. In FIG. 16B, data 26 is accessed through a users credentials, rather than an application's service account, as shown in FIG. 16A. The security and controls 39 of the data network 34 are defined per dataset 26, rather than at each application 10, as done traditionally. This enables real, cross-application security and controls on data and eliminates data duplication. A user 12 can also optionally interact with the data directly via the data network user interface 42, instead of always through an application.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the platform, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A computer implemented system for creating, managing and storing data in a network of data nodes, the system comprising:
   a first node having:
      a first dataset containing at least one data point;
      access control rules defining permissions for each of a plurality of users to view or modify each of the data points in first dataset;
      a first structural metadata data set defining characteristics of each of the data points in the first dataset;
   at least one subsequent node having:
      a subsequent dataset containing at least one further data point;
      subsequent access control rules defining permissions for each of the plurality of users to view or modify each of the at least one further data points in the subsequent data set;
      a subsequent structural metadata dataset defining characteristics of each of the at least one data points in the subsequent dataset;
   wherein one or more links are created to associate the first structural metadata of the first node with the subsequent structural metadata of the subsequent node to create the network of data nodes;
   wherein the links are pointers between the first structural meta data of at least one datapoint in the first node and the subsequent structural meta data of at least one further data point and are stored as structural metadata;
   at least one of a plurality of applications communicating with a query layer to request data and further data in the network and
   wherein the query layer facilitates retrieval of data from with the first dataset and at least one subsequent dataset for use by a plurality of applications;
   thereby eliminating the need for data silos and data access control by the plurality of applications.

2. The system of claim 1, wherein the access control rules comprises data-level entitlement such that the data is used to specify a specific level of entitlement given to the user.

3. The system of claim 2, further comprising a user-friendly interface to interact with the data directly.

4. The system of claim 2, further comprising one or more connectors to link legacy data to the network of datasets.

5. The system of claim 1, wherein the query layer interacts with the network of datasets via a metadata driven API and a metadata driven UI.

6. The system of claim 1, configured to perform automatic data versioning of the source of data, wherein the user has the ability to roll-back to previous versions of the network of datasets.

7. The system of claim 1, wherein the data and the further data is version-controlled.

8. The system of claim 1, wherein the access control rules are defined at the source of data such that the API and UI are forced to automatically respect the access control rules.

9. The system of claim 1, wherein the network of data nodes can be connected to at least one other network of data nodes to create a super network.

10. A computer implemented method for creating, managing and storing data in a network of data nodes, the method comprising:
   providing a first node having:
      a first dataset containing at least one data point;
      access control rules defining permissions for each of a plurality of users to view or modify each of the data points in first dataset;
      a first structural metadata data set defining characteristics of each of the data points in the first dataset;
   at least one subsequent node having:
      a subsequent dataset containing at least one further data point;
      subsequent access control rules defining permissions for each of the plurality of users to view or modify each of the at least one further data points in the subsequent data set;
      a subsequent structural metadata dataset defining characteristics of each of the at least one data points in the subsequent dataset;
   creating one or more links to associate the first structural metadata of the first node with the subsequent structural metadata of the subsequent node to create the network of data nodes;
   wherein the links are pointers between the first structural meta data of at least one datapoint in the first node and the subsequent structural meta data of at least one further data point and are stored as structural metadata:
      providing a query layer to interact with the first dataset and at least one subsequent dataset and a plurality of applications;
      at least one of the plurality of applications communicating with the query layer to request data and further data in the network;
   wherein the query layer facilitates retrieval of data from with the first dataset and at least one subsequent dataset for use by the plurality of applications, thereby eliminating the need for data silos and data access control by the application.

11. The method of claim 10, wherein the access control rules comprises data-level entitlement such that the data is used to specify a specific level of entitlement given to the user.

12. The method of claim 11, wherein the data and the further data is version-controlled.

13. The method of claim 11, further comprising one or more connectors to link legacy data to the network of datasets.

14. The method of claim 10, wherein the query layer interacts with the network of datasets via a metadata driven API and a metadata driven UI.

15. The method of claim 10, configured to perform automatic data versioning of the source of data, wherein the user has the ability to roll-back to previous versions of the network of datasets.

16. The method of claim 10, comprising a two-table architecture comprising a first table for tracking unapproved changes and second table maintaining approved changes.

17. The method of claim 10, wherein the access control rules are defined at the source of data such that the API and UI are forced to automatically respect the access control rules.

18. The method of claim 10, wherein the network of data nodes can be connected to at least one other network of data nodes to create a super network.

\* \* \* \* \*